(12) United States Patent
Benson et al.

(10) Patent No.: US 8,394,485 B2
(45) Date of Patent: Mar. 12, 2013

(54) COMPOUND MOLD AND STRUCTURED SURFACE ARTICLES CONTAINING GEOMETRIC STRUCTURES WITH COMPOUND FACES AND METHOD OF MAKING SAME

(75) Inventors: Gerald M. Benson, Woodbury, MN (US); Kenneth L. Smith, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/037,068

(22) Filed: Feb. 28, 2011

(65) Prior Publication Data
US 2011/0149395 A1 Jun. 23, 2011

Related U.S. Application Data

(62) Division of application No. 09/515,978, filed on Feb. 25, 2000.

(51) Int. Cl.
*B32B 3/00* (2006.01)
*B32B 3/28* (2006.01)
*B32B 3/30* (2006.01)

(52) U.S. Cl. ......... 428/167; 428/156; 428/172; 428/161

(58) Field of Classification Search .................. 428/156, 428/167, 172, 161; 359/529, 530
See application file for complete search history.

(56) References Cited

U.S. PATENT DOCUMENTS

| | | | |
|---|---|---|---|
| 1,194,294 A | 8/1916 | Johanson | |
| 1,591,572 A | 7/1926 | Stimson | |
| 2,310,790 A | 2/1943 | Jungerson | |
| 2,407,680 A | 9/1946 | Palmquist et al. | |
| 3,190,178 A | 6/1965 | McKenzie | |
| 3,417,959 A | 12/1968 | Schultz | |
| 3,632,695 A | 1/1972 | Howell | |
| 3,649,153 A | 3/1972 | Brudy | |
| 3,684,348 A * | 8/1972 | Rowland | 359/530 |
| 3,689,346 A | 9/1972 | Rowland | |
| 3,712,706 A | 1/1973 | Stamm | |
| 3,741,623 A | 6/1973 | Mihalik | |
| 3,810,804 A | 5/1974 | Rowland | |
| 3,811,983 A | 5/1974 | Rowland | |

(Continued)

FOREIGN PATENT DOCUMENTS

| | | |
|---|---|---|
| DE | 44 29 683 C1 | 3/1996 |
| DE | 197 55 061 | 4/2003 |

(Continued)

OTHER PUBLICATIONS

Madou; Fundamentals of Microfabrication; 1997; Chapter 6, pp. 275-323.

(Continued)

*Primary Examiner* — Catherine A Simone
(74) *Attorney, Agent, or Firm* — Sandra K. Nowak; Lisa P. Fulton

(57) ABSTRACT

Structured surface articles such as molds or sheeting are formed on a compound substrate including a machined substrate and a replicated substrate. In one embodiment, the structured surface is a cube corner element on a compound substrate. In another embodiment, the structured surface is a geometric structure that has a plurality of faces, where one face is located on the machined substrate and another face is located on the replicated substrate. In yet another embodiment, at least some of the faces include a compound face with a portion formed on the machined substrate and a portion formed on the replicated substrate.

11 Claims, 13 Drawing Sheets

U.S. PATENT DOCUMENTS

| | | | |
|---|---|---|---|
| 3,873,184 | A | 3/1975 | Heenan |
| 3,922,065 | A | 11/1975 | Schultz |
| 3,924,928 | A | 12/1975 | Trimble |
| 3,924,929 | A | 12/1975 | Holmen et al. |
| 3,926,402 | A | 12/1975 | Heenan |
| 4,025,159 | A | 5/1977 | McGrath |
| 4,066,236 | A | 1/1978 | Lindner |
| 4,066,331 | A | 1/1978 | Lindner |
| 4,095,773 | A | 6/1978 | Lindner |
| 4,149,304 | A | 4/1979 | Brynjegard |
| 4,202,600 | A | 5/1980 | Burke et al. |
| 4,208,090 | A | 6/1980 | Heenan |
| 4,243,618 | A | 1/1981 | Van Arnam |
| 4,275,258 | A | 6/1981 | Harmsen et al. |
| 4,349,598 | A | 9/1982 | White |
| 4,478,769 | A | 10/1984 | Pricone et al. |
| 4,498,733 | A | 2/1985 | Flanagan |
| 4,576,850 | A | 3/1986 | Martens |
| 4,582,885 | A | 4/1986 | Barber |
| 4,588,258 | A | 5/1986 | Hoopman |
| 4,601,861 | A | 7/1986 | Pricone et al. |
| 4,618,518 | A | 10/1986 | Pricone et al. |
| 4,668,558 | A | 5/1987 | Barber |
| 4,726,706 | A | 2/1988 | Attar |
| 4,775,219 | A | 10/1988 | Appeldorn et al. |
| 4,798,178 | A | 1/1989 | Greulich et al. |
| 4,801,193 | A | 1/1989 | Martin |
| 4,895,428 | A | 1/1990 | Nelson et al. |
| 4,938,563 | A | 7/1990 | Nelson et al. |
| 5,117,304 | A | 5/1992 | Huang et al. |
| 5,122,902 | A | 6/1992 | Benson |
| 5,156,863 | A | 10/1992 | Pricone et al. |
| 5,171,624 | A | 12/1992 | Walter |
| 5,175,030 | A | 12/1992 | Lu et al. |
| 5,183,597 | A | 2/1993 | Lu |
| 5,429,857 | A | 7/1995 | Amemiya et al. |
| 5,450,235 | A | 9/1995 | Smith et al. |
| 5,564,870 | A | 10/1996 | Benson et al. |
| 5,565,151 | A | 10/1996 | Nilsen |
| 5,600,484 | A | 2/1997 | Benson et al. |
| 5,614,286 | A * | 3/1997 | Bacon et al. ............ 428/161 |
| 5,657,126 | A | 8/1997 | Ducharme et al. |
| 5,657,162 | A * | 8/1997 | Nilsen et al. ............ 359/530 |
| 5,696,627 | A | 12/1997 | Benson et al. |
| 5,706,132 | A * | 1/1998 | Nestegard et al. ........ 359/529 |
| 5,734,501 | A | 3/1998 | Smith |
| 5,759,468 | A | 6/1998 | Smith et al. |
| 5,812,315 | A | 9/1998 | Smith et al. |
| 5,822,121 | A | 10/1998 | Smith et al. |
| 5,837,082 | A | 11/1998 | Grafe |
| 5,840,406 | A | 11/1998 | Nilsen |
| 5,866,233 | A | 2/1999 | Oshima et al. |
| 5,914,812 | A | 6/1999 | Benson et al. |
| 5,946,134 | A | 8/1999 | Benson et al. |
| 5,959,774 | A | 9/1999 | Benson et al. |
| 6,010,609 | A | 1/2000 | Mimura et al. |
| 6,083,607 | A * | 7/2000 | Mimura et al. ............ 428/167 |
| 6,136,416 | A | 10/2000 | Smith et al. |
| 6,277,470 | B1 | 8/2001 | Smith et al. |
| 6,386,855 | B1 | 5/2002 | Luttrell et al. |
| 6,413,615 | B2 | 7/2002 | Smith et al. |
| 6,540,367 | B1 | 4/2003 | Benson et al. |

FOREIGN PATENT DOCUMENTS

| | | |
|---|---|---|
| EP | 0 390 344 | 10/1990 |
| EP | 0 887 665 | 12/1998 |
| GB | 423464 | 2/1935 |
| GB | 441319 | 1/1936 |
| JP | 57138510 | 8/1982 |
| JP | 63-306824 | 12/1988 |
| JP | 05-164132 | 6/1993 |
| JP | 07-135276 | 5/1995 |
| JP | 8-309851 | 11/1996 |
| JP | 2006-189664 | 7/2006 |
| WO | WO 94/14091 | 6/1994 |
| WO | WO 95/11464 | 4/1995 |
| WO | WO 95/11469 | 4/1995 |
| WO | WO 95/11471 | 4/1995 |
| WO | WO 96/33839 | 10/1996 |
| WO | WO 97/04939 | 2/1997 |
| WO | WO 9818028 A1 * | 4/1998 |
| WO | WO 98/19842 | 5/1998 |
| WO | WO 98/56966 | 12/1998 |
| WO | WO 99/01273 | 1/1999 |
| WO | WO 99/01275 | 1/1999 |
| WO | WO 00/60385 | 10/2000 |

OTHER PUBLICATIONS

Sheet entitled "Techmetal 123 Amorphous Nickel Alloy Coating" from Techmetals, Inc.; Jul. 1994; 1 pg.

Decision on Appeal Before the Board of Patent Appeals and Interferences, U.S. Appl. No. 09/515,978, Appeal No. 2007-2987, decided Nov. 30, 2007, 17 pages.

* cited by examiner

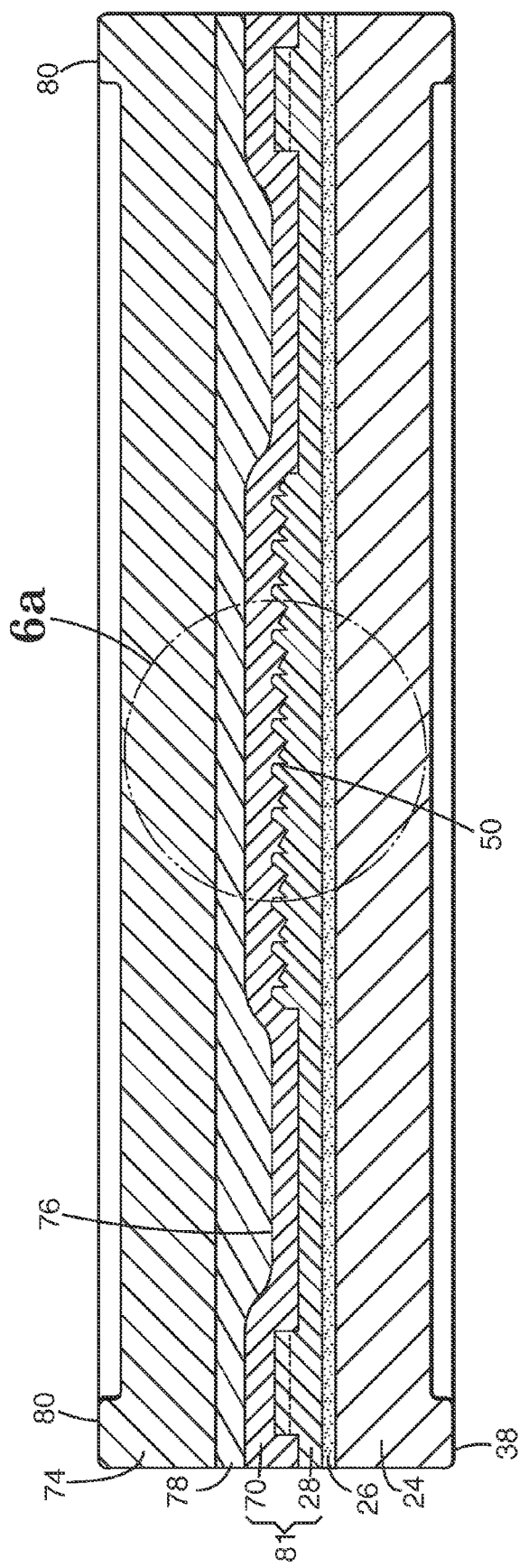

COMPOUND MOLD AND STRUCTURED SURFACE ARTICLES CONTAINING GEOMETRIC STRUCTURES WITH COMPOUND FACES AND METHOD OF MAKING SAME

RELATED APPLICATION

This application is a division of and claims benefit and priority to U.S. patent application Ser. No. 09/515,978 filed Feb. 25, 2000.

BACKGROUND

The present invention relates generally to structured surfaces fabricated using microreplication techniques. The invention has particular application to structured surfaces that comprise retroreflective cube corner elements.

The reader is directed to the glossary at the end of the specification for guidance on the meaning of certain terms used herein.

It is known to use microreplicated structured surfaces in a variety of end use applications such as retroreflective sheeting, mechanical fasteners, and abrasive products. Although the description that follows focuses on the field of retroreflection, it will be apparent that the disclosed methods and articles can equally well be applied to other fields that make use of microreplicated structured surfaces.

Cube corner retroreflective sheeting typically comprises a thin transparent layer having a substantially planar front surface and a rear structured surface comprising a plurality of geometric structures, some or all of which include three reflective faces configured as a cube corner element.

Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroplating to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, laminate techniques, and direct machining techniques. Each of these techniques has its own benefits and limitations.

In pin bundling techniques, a plurality of pins, each having a geometric shape such as a cube corner element on one end, are assembled together to form a master mold. U.S. Pat. Nos. 1,591,572 (Stimson) and 3,926,402 (Heenan) provide illustrative examples. Pin bundling offers the ability to manufacture a wide variety of cube corner geometry in a single mold, because each pin is individually machined. However, such techniques are impractical for making small cube corner elements (e.g., those having a cube height less than about 1 millimeter) because of the large number of pins and the diminishing size thereof required to be precisely machined and then arranged in a bundle to form the mold.

In laminate techniques, a plurality of plate-like structures known as laminae, each lamina having geometric shapes formed on one end, are assembled together to form a master mold. Laminate techniques are generally less labor intensive than pin bundling techniques, because the number of parts to be separately machined is considerably smaller, for a given size mold and cube corner element. However, design flexibility suffers relative to that achievable by pin bundling. Illustrative examples of laminate techniques can be found in U.S. Pat. No. 4,095,773 (Lindner); International Publication No. WO 97/04939 (Mimura et al.); and U.S. application Ser. No. 08/886,074, "Cube Corner Sheeting Mold and Method of Making the Same", filed Jul. 2, 1997.

In direct machining techniques, series of grooved side surfaces are formed in the plane of a planar substrate to form a master mold. In one well known embodiment, three sets of parallel grooves intersect each other at 60 degree included angles to form an array of cube corner elements, each having an equilateral base triangle (see U.S. Pat. No. 3,712,706 (Stamm)). In another embodiment, two sets of grooves intersect each other at an angle greater than 60 degrees and a third set of grooves intersects each of the other two sets at an angle less than 60 degrees to form an array of canted cube corner element matched pairs (see U.S. Pat. No. 4,588,258 (Hoopman)). Direct machining techniques offer the ability to accurately machine very small cube corner elements in a manner more difficult to achieve using pin bundling or laminate techniques because of the latter techniques' reliance on constituent parts that can move or shift relative to each other, and that may separate from each other, whether during construction of the mold or at other times. Further, direct machining techniques produce large area structured surfaces that generally have higher uniformity and fidelity than those made by pin bundling or laminate techniques, since, in direct machining, a large number of individual faces are typically formed in a continuous motion of the cutting tool, and such individual faces maintain their alignment throughout the mold fabrication procedure.

However, a significant drawback to direct machining techniques has been reduced design flexibility in the types of cube corner geometry that can be produced. By way of example, the maximum theoretical total light return of the cube corner elements depicted in the Stamm patent referenced above is approximately 67%. Since the issuance of that patent, structures and techniques have been disclosed which greatly expand the variety of cube corner designs available to the designer using direct machining See, for example, U.S. Pat. Nos. 4,775,219 (Appledorn et al.); 4,895,428 (Nelson et al.); 5,600,484 (Benson et al.); 5,696,627 (Benson et al.); and 5,734,501 (Smith). Some of the cube corner designs disclosed in these later references can exhibit effective aperture values well above 67% at certain observation and entrance geometry.

Nevertheless, an entire class of cube corner elements, referred to herein as "preferred geometry" or "PG" cube corner elements, have up until now remained out of reach of known direct machining techniques. A substrate incorporating one type of PG cube corner element is shown in the top plan view of FIG. 1. The cube corner elements shown there each have three square faces, and a hexagonal outline in plan view. One of the PG cube corner elements is highlighted in bold outline for ease of identification. The highlighted cube corner element can be seen to be a PG cube corner element because it has a non-dihedral edge (any one of the six edges that have been highlighted in bold) that is inclined relative to the plane of the structured surface, and such edge is parallel to adjacent nondihedral edges of neighboring cube corner elements (each such edge highlighted in bold is not only parallel to but is contiguous with nondihedral edges of its six neighboring cube corner elements).

Disclosed herein are methods for making geometric structures, such as PG cube corner elements, that make use of direct machining techniques. Also disclosed are molds to manufacture articles according to such methods, such articles characterized by having at least one specially configured compound face.

BRIEF SUMMARY

Structured surface articles such as molds or sheeting are formed on a compound substrate comprising a machined substrate and a replicated substrate. In one embodiment, the structured surface is a cube corner element on a compound substrate. In another embodiment, the structured surface comprises a geometric structure that has a plurality of faces, where one face is located on the machined substrate and another face is located on the replicated substrate. The geometric structure can optionally be a cube corner element or a PG cube corner element.

In yet another embodiment, at least some of the faces comprise a compound face with a portion formed on the machined substrate and a portion formed on the substantially replicated substrate. A transition line may separate the portion of a compound face located on the machined substrate from the portion located on the replicated substrate. The portion of the compound face on the machined substrate and the portion on the replicated substrate typically have angular orientations that differ by less than 10 degrees of arc.

Another embodiment is directed to a geometric structure having a plurality of faces disposed on a compound substrate. The compound substrate comprises a machined substrate having a structured surface and a substantially replicated substrate bonded along only a portion of an interface with the machined substrate.

In another embodiment, the compound substrate comprises a substantially replicated substrate having a structured surface and a discontinuous machined substrate covering only a portion of the structured surface. The compound substrate also comprises at least one geometric structure having at least one face disposed on the structured surface and at least another face disposed on the machined substrate.

Another embodiment is directed to a compound substrate comprising a substantially replicated substrate and a machined substrate. The replicated substrate has a structured surface and the machined substrate disposed in discrete pieces on the structured surface.

Another embodiment is directed to a compound mold having a structured surface comprising cavities formed in a replicated substrate and a plurality of pyramids bordering the cavities that are machined at least in part in a machined substrate of the compound substrate.

Cube corner elements, and structured surfaces incorporating an array of such elements, are disclosed wherein at least one face of the cube corner element terminates at a nondihedral edge of such element, the face comprising two constituent faces disposed on opposed sides of a transition line that is nonparallel to the nondihedral edge. The cube corner element can comprise a PG cube corner element where some or all of such elements comprise two constituent faces disposed on opposed sides of a transition line that is nonparallel to the respective nondihedral edge and the transition line comprises an interface between two adjacent layers of a compound substrate. In an array of neighboring cube corner elements, each cube corner element in the array can have at least one face configured as described above. Further, the cube corner elements can be made very small (well under 1 mm cube height) due to the direct machining techniques employed.

Also disclosed is a method of making a structured surface article comprising a geometric structure having a plurality of faces. The method comprises the steps of forming an array of geometric structures in a first surface of a machined substrate; passivating selected locations of the first surface of the machined substrate; forming a replicated substrate of the machined substrate to form a compound substrate; forming an array of second geometric structures on a second surface opposite the first surface on the machined substrate; and removing selected portions from the second surface of the machined substrate to form an array of neighboring cube corner elements. The cube corner elements can be PG cube corner elements.

In another embodiment, the method of making a structured surface article comprises the steps of forming an array of geometric structures in a first surface of a machined substrate; passivating selected locations of the first surface of the machined substrate; forming a replicated substrate of the machined substrate to form a compound substrate; forming an array of second geometric structures on a second surface opposite the first surface on the machined substrate; and removing selected portions from the second surface of the machined substrate to form a geometric structure having a plurality of faces, wherein at least one of the faces is located on the machined substrate and at least one of the faces is located on the replicated substrate.

In another embodiment, the method of making a geometric structure in an article comprises providing a compound substrate having a structured surface formed along an internal interface between two substrates; and forming grooved side surfaces in an exposed surface of the compound substrate to form a geometric structure, the geometric structure comprising a portion of the internal interface and a portion of the grooved side surfaces.

BRIEF DESCRIPTION OF THE DRAWINGS

FIG. 6 is a sectional view of an assembly including a compound substrate.

Figure 1:
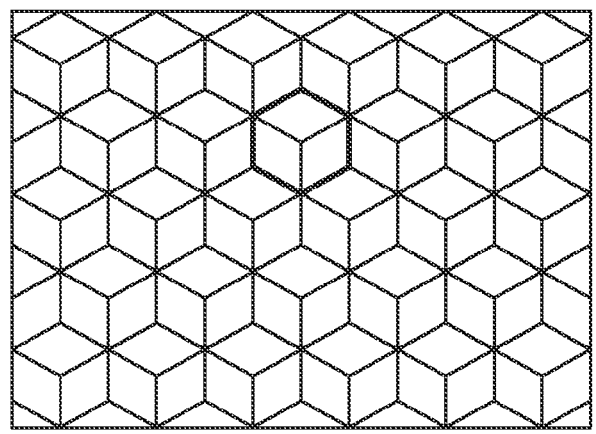
FIG. 1 is a plan view of a structured surface comprising one type of PG cube corner element array, known from the PRIOR ART.

In the drawings, the same reference symbol is used for convenience to indicate elements that are the same or that perform the same or a similar function.

DETAILED DESCRIPTION OF THE ILLUSTRATIVE EMBODIMENTS

Figure 2:
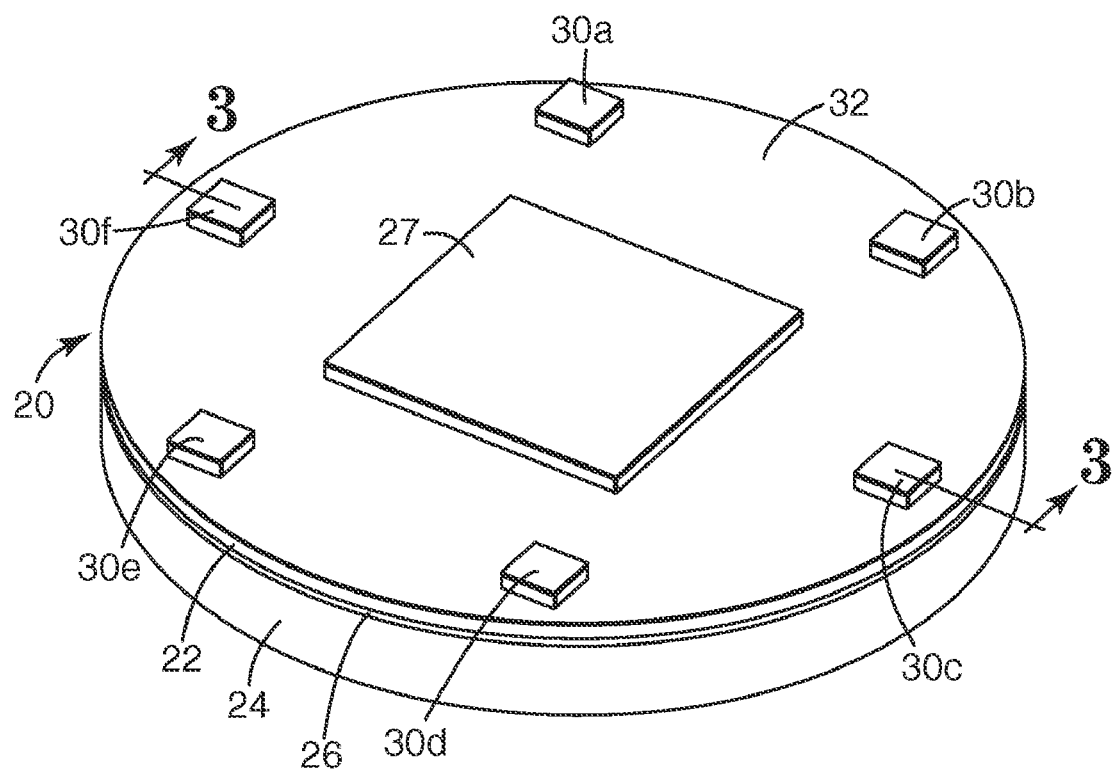
FIG. 2 is a perspective view of an assembly including a machined substrate.
Figure 3:
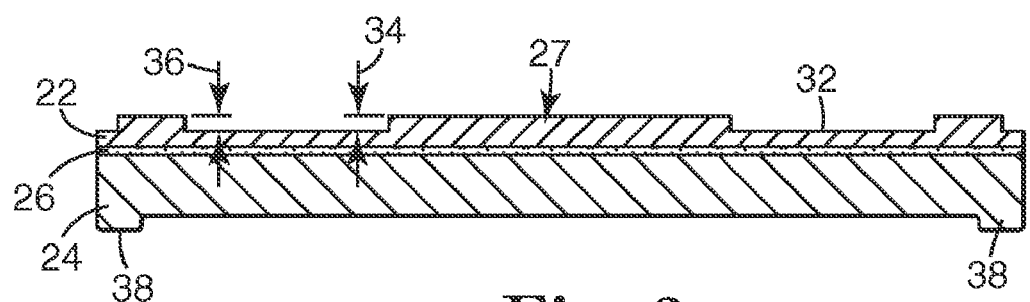
FIG. 3 is a sectional view of the substrate of FIG. 2.

FIGS. 2 and 3 illustrate an assembly 20 useful for making a structured surface (see FIGS. 9-10) in accordance with the present invention. The assembly 20 includes a blank 22 bonded to a first machining base 24 by a first bonding layer 26. In the illustrated embodiment, the blank 22 is a continuous structure that includes a deck 27 and a series of reference pads 30a, 30b, 30c, 30d, 30e, 30f (collectively referred to as 30) that extend above surface 32. In one embodiment, the deck 27 has a height 34 generally equal to a height 36 of the reference pads 30. The number of reference pads 30 can vary depending upon the application. In an alternate embodiment, the deck 27 and the reference pads 30 can be discrete elements bonded to the first machining base 24, rather than the continuous blank 22 shown in FIG. 2.

Blank 22 is composed of a material that can be scribed, cut, or otherwise machined without significant post-machining deformation and without substantial burring. This is to ensure that the machined faces, or replications thereof in other substrates, can function as effective optical reflectors. The blank 22 may be constructed from various materials, such as copper, nickel, aluminum, acrylic, or other polymeric materials. Further discussion on suitable substrate materials is given below. In one embodiment, the blank 22 is a thin metal sheet material approximately 0.030 inches thick.

The blank 22 is bonded to a first machining base 24 using a suitable bonding layer 26, such as epoxy, wax, thermoform or thermoset adhesives, and the like. In the illustrated embodiment, the first machining base 24 is a metal plate approximately 2.54 centimeters (1.0 inch) thick. The first machining base 24 supports the relatively thin blank 22 and provides reference surfaces 38 for subsequent machining operations. Although the circular shape of the assembly 20 is convenient for subsequent electro-plating operations, the circular shape is not required.

Figure 4:
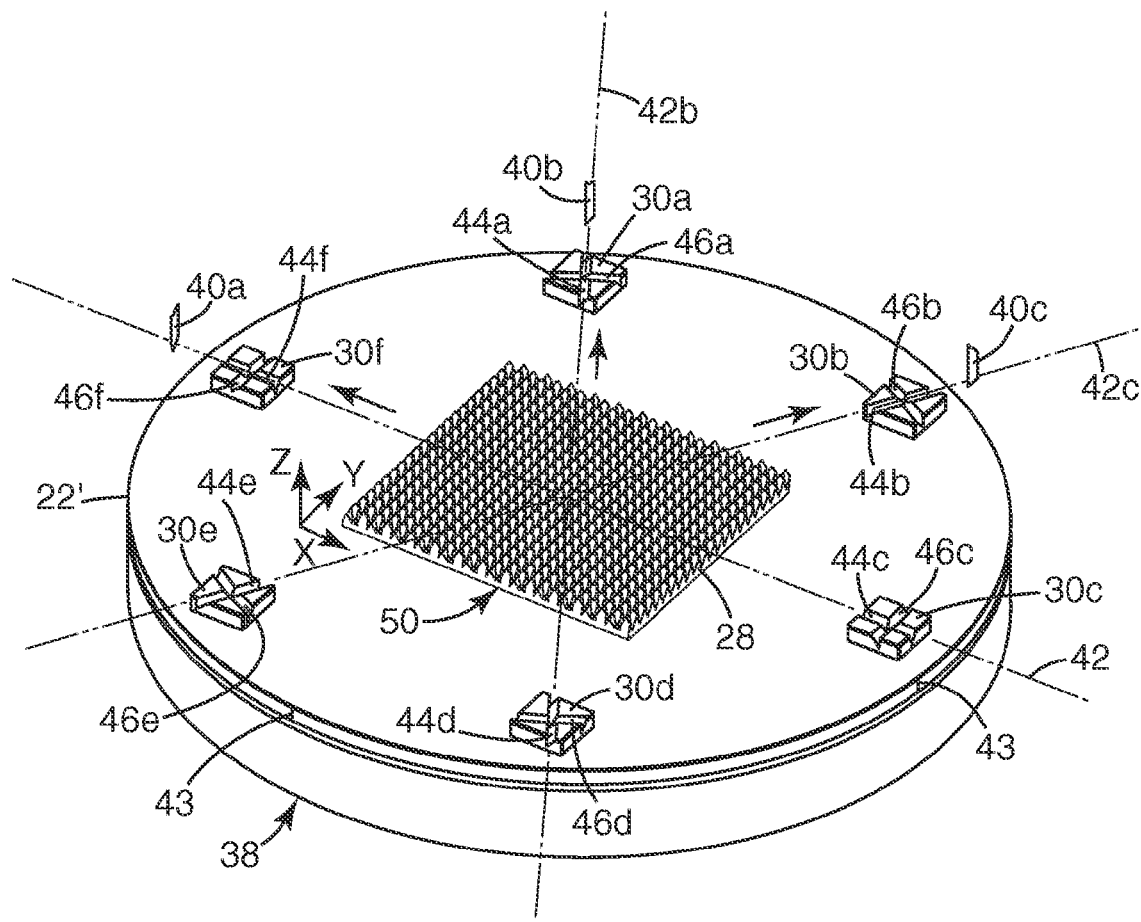
FIG. 4 is a perspective view of the substrate of FIG. 2 after a first machining operation.

FIG. 4 depicts the machining operation to form a machined substrate 28 in the deck portion 27 of the blank 22. Cutting tools 40a, 40b, 40c (collectively referred to as 40) move along the deck 27 (see FIG. 2) to form a structured surface 50 of machined substrate 28, whether by motion of the cutting tools or the substrate or both, to form groove side surfaces (see FIG. 5). The cutting tool 40a forms reference grooves 44c, 44f in respective reference pads 30c, 30f; cutting tool 40b forms reference grooves 44a, 44d in respective reference pads 30a, 30d, and cutting tool 40c forms reference grooves 44b, 44e in respective reference pads 30b, 30e. A circular reference groove 46a, 46b, 46c, 46d, 46e, 46f concentric with the center of the machined substrate 28 is optionally formed in each of the respective reference pads 30. Reference marks 43 may optionally be formed on the edge of the modified blank 22' to assist in locating the compound substrate 82 to perform the cutting operations illustrated in FIG. 7.

Each tool 40 is depicted as a so-called "half-angle" tool, which produces grooved side surfaces as it progresses through the material rather than a pair of opposed groove side surfaces, although this is not necessary. In the illustrated embodiment, one of the grooved side surfaces is substantially vertical (see FIG. 5). Consistent with direct machining procedures, cutting tools 40 move along axes 42a, 42b, 42c that are substantially parallel to the x-y reference plane defined by the reference surface 38, thus ensuring that the respective groove side surfaces also extend along axes that are substantially parallel to the reference plane. In the illustrated embodiment, each of the axes 42a, 42b, 42c intersect two of the reference pads 30. Preferably, the axes 42a, 42b, 42c are carefully positioned and the tool orientation carefully selected so that the groove side surfaces have a generally uniform depth.

It should be noted that although three cutting tools are shown in FIG. 4, a single cutting tool could be used. The cutting tool can be made of diamond or other suitably hard material. The machined faces can be formed by any one of a number of known material removal techniques, for example: milling, where a rotating cutter, spinning about its own axis, is tilted and drawn along the surface of the substrate; fly-cutting, where a cutter such as a diamond is mounted on the periphery of a rapidly rotating wheel or similar structure which is then drawn along the surface of the substrate; ruling, where a nonrotating cutter such as a diamond is drawn along the surface of the substrate; and grinding, where a rotating wheel with a cutting tip or edge is drawn along the surface of the substrate. Of these, preferred methods are those of fly-cutting and ruling. It is not critical during the machining operation whether the cutting tool, the substrate, or both are translated relative to the surroundings. Full-angle cutting tools are preferred when possible over half-angle tools because the former are less prone to breakage and allow higher machining rates. Finally, cutting tools having a curved portion or portions can be used in the disclosed embodiments to provide non-flat (curved) surfaces or faces in order to achieve desired optical or mechanical effects.

Figure 5:
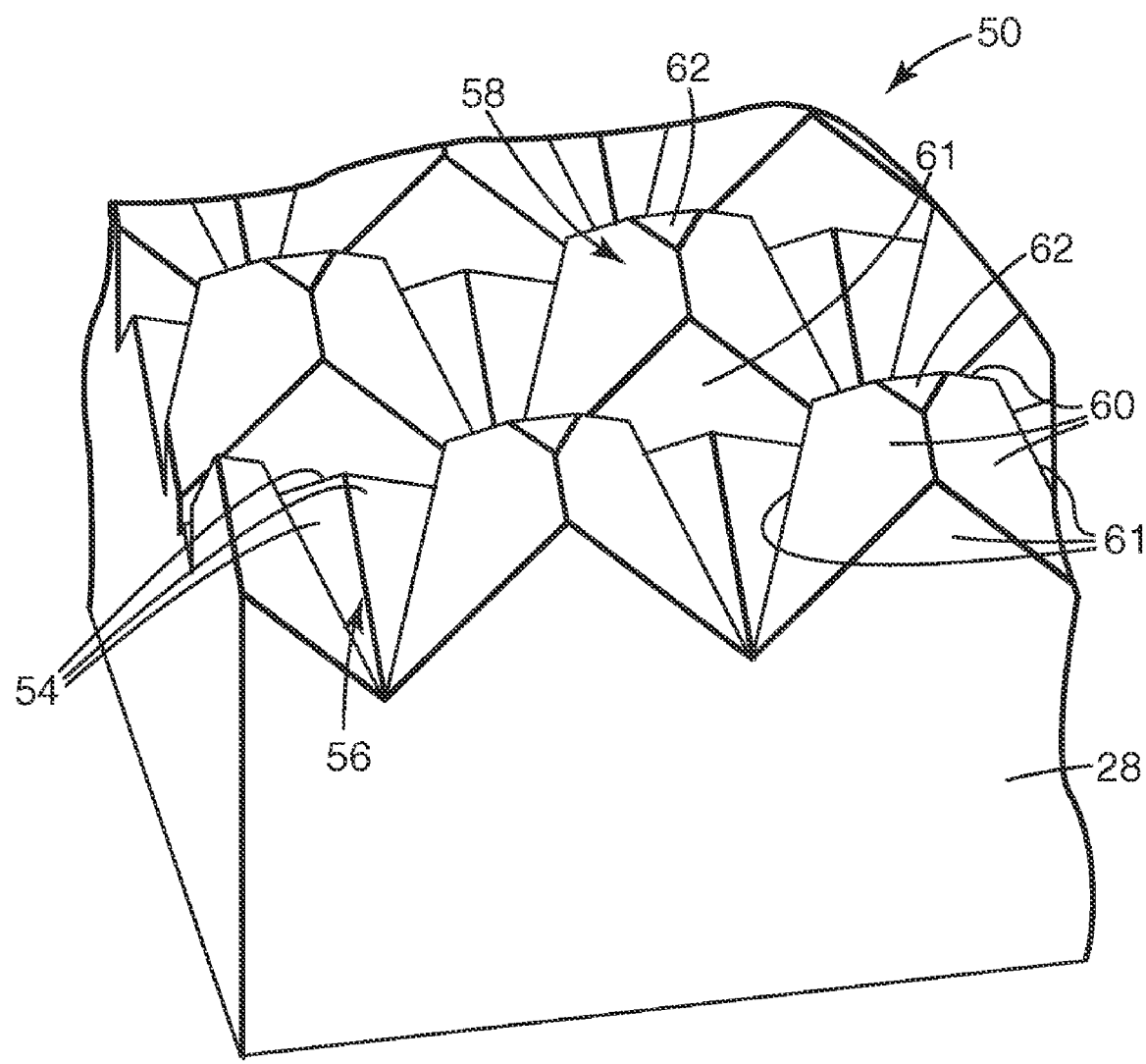
FIG. 5 is a close-up perspective view of a portion of the machined substrate illustrated in FIG. 4.

FIG. 5 shows an enlarged section of the structured surface 50 machined in the machined substrate 28 illustrated in FIG. 4. Structured surface 50 includes faces 54 arranged in groups of three that form cube corner pyramids 56. Interspersed between cube corner pyramids 56 on structured surface 50 are protrusions 58. The protrusions 58 as shown each have three mutually perpendicular side surfaces 60, three generally vertical surfaces 61, and a top surface 62. Depending on the procedure used to make the structured surface 50, the generally vertical surfaces 61 of the protrusions 58 can be inclined to a greater or lesser extent away from the vertical. In the illustrated embodiment, the cube corner pyramids 56 cover about 50% of the machined substrate and the protrusions 58 cover the other 50% of the substrate.

The structured surface 50 is then cleaned and passivated. The passivation step comprises applying a release layer or modifying the surface 50 to permit separation of a subsequent replicated substrate 70 (see FIG. 6). In an embodiment where the blank 22 is constructed from metal, such as copper, the structured surface 50 can be passivated with potassium dichromate or other passive solutions. In an embodiment where the blank 22 is constructed from acrylic or another polymeric material, vapor coated or chemically deposited silver can be used to create the release layer. The passivation step can be modified depending upon the material used for the machined substrate 28 and the replicated substrate 70.

In order to permit selective adhesion of the replicated substrate 70 to the structured surface 50, the top surfaces 62 of the protrusions 58 are treated. In one embodiment, the top surfaces 62 are abraded. Abrasion of the top surfaces 62 can be accomplished using a planarization process, fly cutting, or a variety of other processes.

Figure 6A:
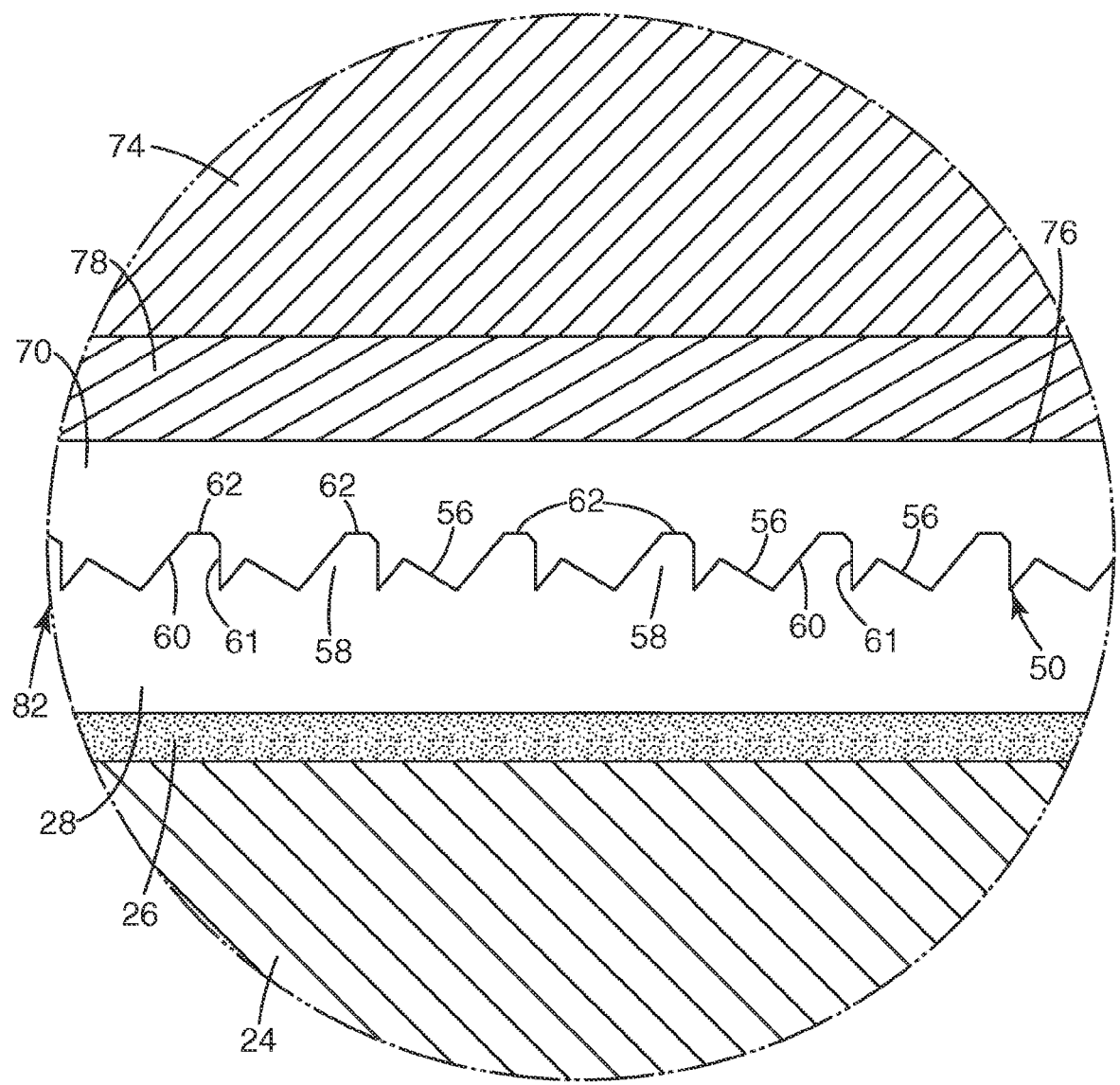
FIG. 6a is an enlarged section of the compound substrate of FIG. 6.

FIGS. 6 and 6a illustrate an assembly 81 that results after forming a replicated substrate 70 over the machined substrate 28 and the reference pads 30. Electro-plating, casting a filler material, and a variety of other techniques can form the replicated substrate 70. The thickness of the replicated substrate 70 is a matter of design choice. In the illustrated embodiment, the replicated substrate 70 has a thickness of about 2 times the height of the desired cube corner elements.

As best illustrated in FIG. 6a, due to the previous passivation and abrasion steps, the replicated substrate 70 adheres to the structured surface 50 along the top surface 62 of the protrusions 58, but not along the passivated surfaces of the pyramids 56 and the side surfaces 60, 61 of the protrusions 58. Portions of the replicated substrate 70 protrude into the machined substrate 28 to form a compound substrate 82 (see also FIG. 9). A second machining base 74 is bonded to rear surface 76 of the replicated substrate 70 using a suitable bonding layer 78. Like the first machining base 24, the second machining base 74 includes reference surfaces 80 to aid in subsequent machining steps. The first machining base 24 and bonding layer 26 are no longer needed for the process and are removed from the assembly 20.

Figure 7:
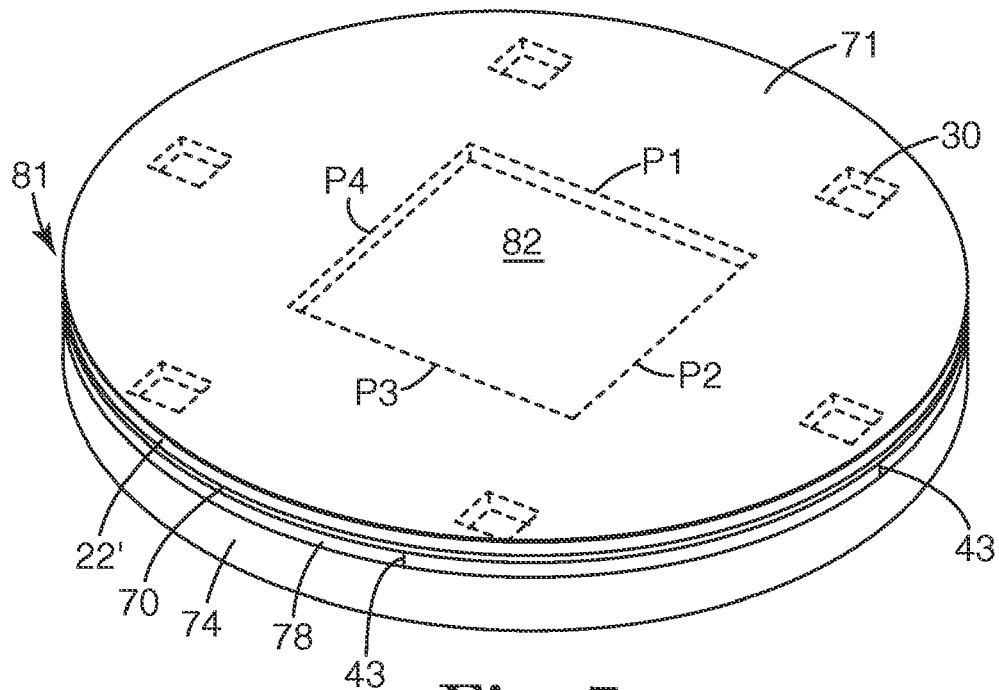
FIG. 7 is a perspective view of the assembly of FIG. 6 with one of the machining bases removed.

FIG. 7 is a perspective view of an assembly 81 comprising the modified blank 22' (machined substrate 28 and reference pads 30) selectively bonded to the replicated substrate 70. The replicated substrate 70 is bonded to the second machining base 74 by the bonding layer 78. In the illustrated embodiment, rear surface 71 of the modified blank 22' is substantially flat. The compound substrate 82 and reference pads 30 embedded in the assembly 81 are shown in phantom for purposes of illustration only.

A series of four cuts are made around the perimeter P1, P2, P3, P4 of compound substrate 82, permitting the portions of the modified blank 22' surrounding the machined substrate 28 to be removed from the assembly 81. Reference marks 43 may optionally be used to locate the compound substrate 82. The passivation layer facilitates removal of this waste material. In an embodiment where the blank 22 and replicated substrate 70 are constructed from metal, the portion of the blank 22 surrounding the machined substrate 28 is a thin layer that can be peeled from the replicated substrate 70.

Figure 8:
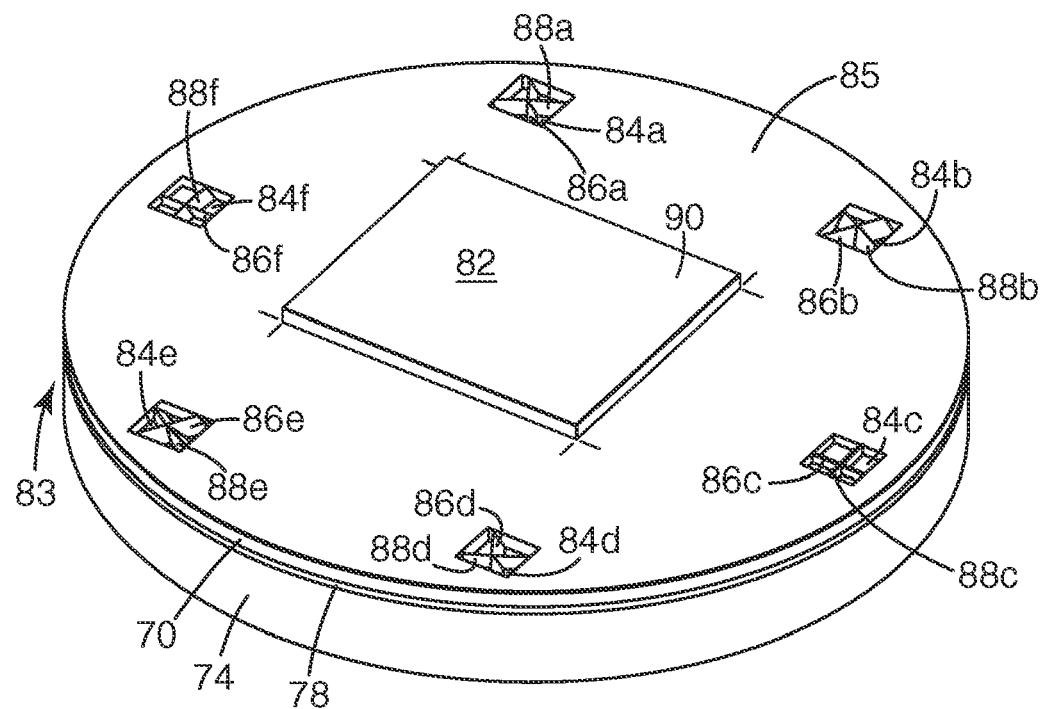
FIG. 8 is a perspective view of the assembly of FIG. 7 with a portion of a blank surrounding the machined substrate removed.

FIG. 8 is a perspective view of a modified assembly 83 with the portions of the blank 22 surrounding the compound substrate 82 removed. Surface 85 is of the replicated substrate 70. Surface 90, which extends above the surface 85, is the back surface of the machined substrate 28. Reference pad replicas 84a, 84b, 84c, 84d, 84e, 84f (collectively referred to as 84) of the reference pads 30 define cavities in the surface 85. The reference pad replicas 84a, 84d have respective parallel ridges 86a, 86d, replicas 84b, 84e have respective parallel ridges 86b, 86e, and replicas 84c, 84f have respective parallel ridges 86c, 86f (collectively referred to as 86). Each of the reference pad replicas 84 has a ridge 88a, 88b, 88c, 88c, 88d, 88e, 88f (collectively referred to as 88), respectively, defining a circle concentric with the center of the compound substrate 82. In the illustrated embodiment, the tops of the ridges 86, 88 are generally coplanar with the surface 85.

Figure 9:
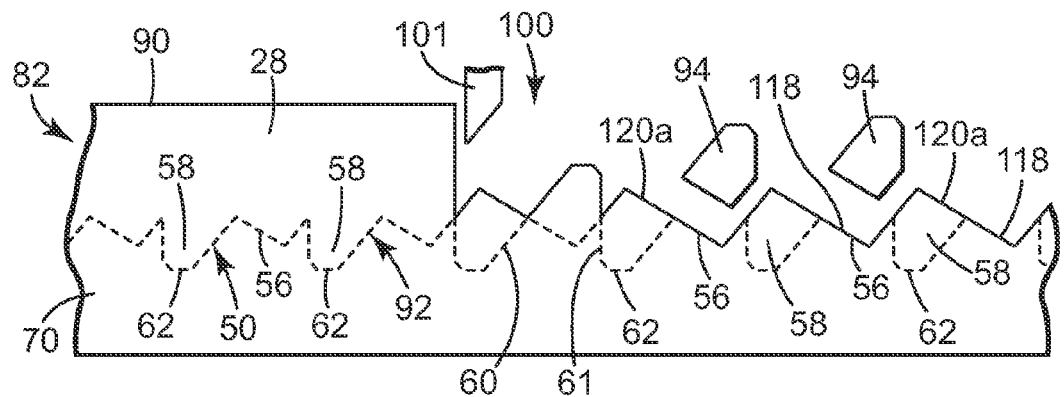
FIG. 9 is cross-sectional view of the machining of the compound substrate of FIG. 7.

FIG. 9 is a schematic illustration of the machining step performed on the back surface 90 of the machined substrate 28. In the illustrated embodiment, the compound substrate 82 comprises the machined substrate 28 and the un-separated replicated substrate 70. The interface 92 between the structured surface 50 and the replicated substrate 70 is indicated by dashed line. Bonding at the interface 92, however, is limited to the abraded top surfaces 62 of the protrusions 58. The passivation layer prevents or minimizes adhesion along the remainder of the interface 92, such as along the pyramids 56 or the side surfaces 60, 61 of the protrusions 58.

The machining step illustrated in FIG. 4 is then performed on the back surface 90 of the machined substrate 28 using the ridges 86, 88 as reference points to guide tool 101. The tool 101 may or may not be a half-angle tool. In an embodiment where the machined substrate 28 and/or the replicated substrate 70 are formed from a transparent or semi-transparent material, or where the interface between the machined substrate 28 and replicated substrate 70 can be viewed along the perimeter P1, P2, P3, P4 of compound substrate 82, the reference pad replicas 84 may be unnecessary. That is, alignment of the tools 42a, 42b, 42c can be accomplished without resort to the reference pad replicas 84. Where the machined substrate 28 is formed from an opaque material such as metal, the reference pad replicas 84 (and particularly the ridges 86) provide precise reference points so that the machining step illustrated in FIG. 9 can be performed.

After cuts are made along all three axes 42a, 42b, 42c, waste portions 94 of the machined substrate 28 fall away or are removed, leaving a cube corner cavity 118 in the replicated substrate 70. In some embodiments, the tool 101 may cut into the replicated substrate 70 such that the replicated substrate may include a replicated or formed portion and a machined portion. The distal ends or top surfaces 62 of the discrete pieces or protrusions 58 from the machined substrate 28 are bonded to the replicated substrate 70. Bottom or proximal portions of the protrusions 58 are machined to form cube corner pyramids 120a. The protrusions 58 on the machined substrate 28 remain embedded in the replicated substrate 70. Once all of the waste portions 94 of the machined substrate 28 are removed from the replicated substrate 70, the cube corner pyramids 120a and cube corner cavities 118 form a geometric structured surface 100 with an array of PG cube corner elements (see FIG. 10).

Figure 10:
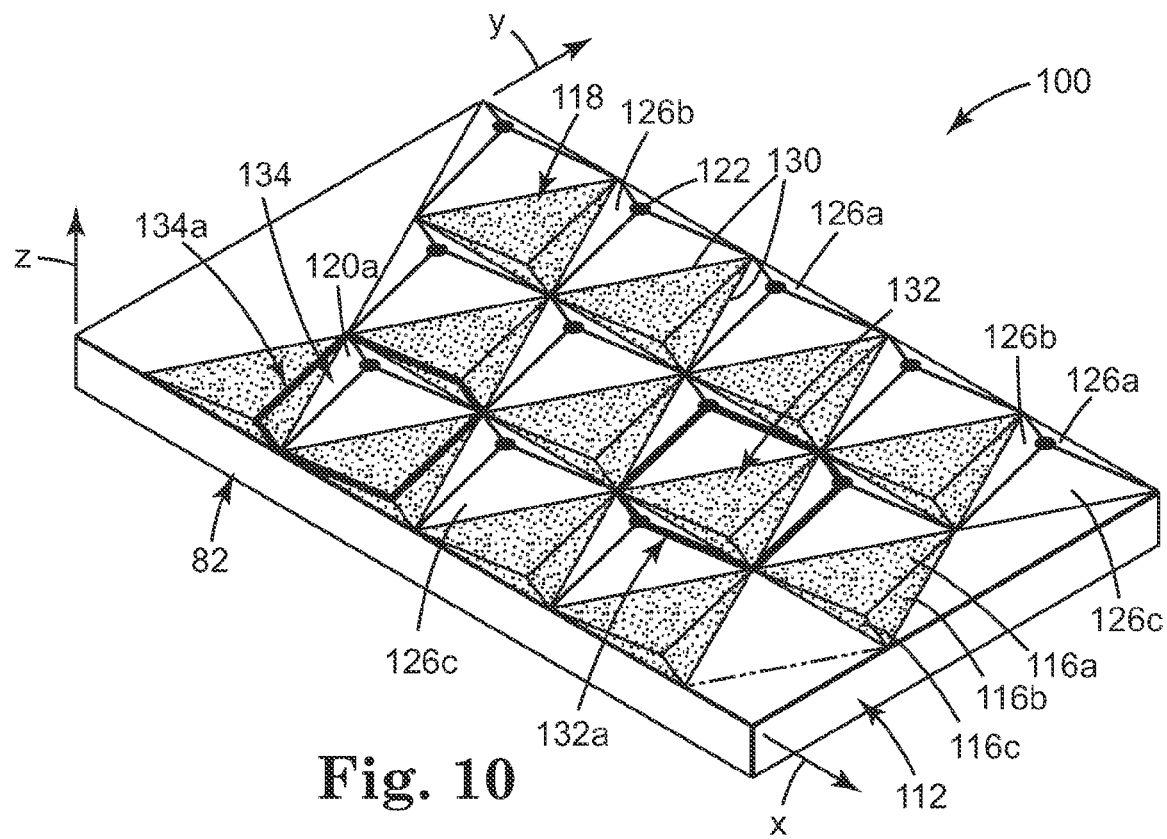
FIG. 10 is a perspective view of the compound substrate of FIG. 8 after the second machining operation.

FIG. 10 is a view of a geometric structured surface 100 on compound substrate 82 after all groove side surfaces have been formed. Each of the cube corner cavities 118 has three replicated faces 116a, 116b, 116c and each of the cube corner pyramids 120a has three machined faces 126a, 126b, 126c, configured approximately mutually perpendicular to each other. In the case where the three faces of a cube corner pyramid 120a are substantially aligned with adjacent faces 116 of cavities 118, and where such cavities 118 have a common orientation, the three faces of cube corner pyramid 120a (when considered separately) form a "truncated" cube corner pyramid. Such a pyramid is characterized by having exactly three nondihedral edges that form a "base triangle" in the plane of the structured surface.

Each of the three faces 126a-c of the cube corner pyramids 120a are machined to be substantially aligned with the nearest face 116 of an adjacent cube corner cavity 118. Consequently, each new cube corner cavity 132 comprising one replicated cube corner cavity 118 and one machined face 126 from each of its neighboring geometric structures 120a. Reference numeral 132a shows in bold outline one such cube corner cavity 132. A given face of one of the cube corner cavities 132 comprises one face of a cube corner cavity 118 formed in the replicated substrate 70 and one of the faces 126a, 126b, or 126c machined in the machined substrate 28. As will be discussed infra, faces 116 of the cube corner cavity 118 are machined in the replicated substrate 70. Therefore, each cube corner cavity 132 comprises a compound face made up of a portion substantially formed or replicated in the replicated substrate 70 and a portion machined in the machined substrate 28 separated by a transition line 130. The transition lines 130 lie along the boundary or interface between the machined substrate 28 and the replicated substrate 70.

One can also identify new cube corner pyramids 134 formed on the structured surface shown in FIG. 10. Each cube corner pyramid 134 comprises one geometric structure 120a, which is a cube corner pyramid, and one face each of its neighboring cube corner cavities 118. Each face of one of the pyramids 134 is a compound face comprising a face 116 of one of the cavities 118 in the replicated substrate 70 and a machined face from structure 120a formed from the machined substrate 28. Reference numeral 134a shows in bold outline of one such cube corner pyramid 134. Note that the reference points 122 locate the uppermost extremities or peaks of the pyramids 134. Both cube corner pyramids 134 and cube corner cavities 132 are PG cube corner elements, since both have a face terminating at a nondihedral edge of the cube corner element, such nondihedral edge being nonparallel to reference plane x-y.

Figure 11:
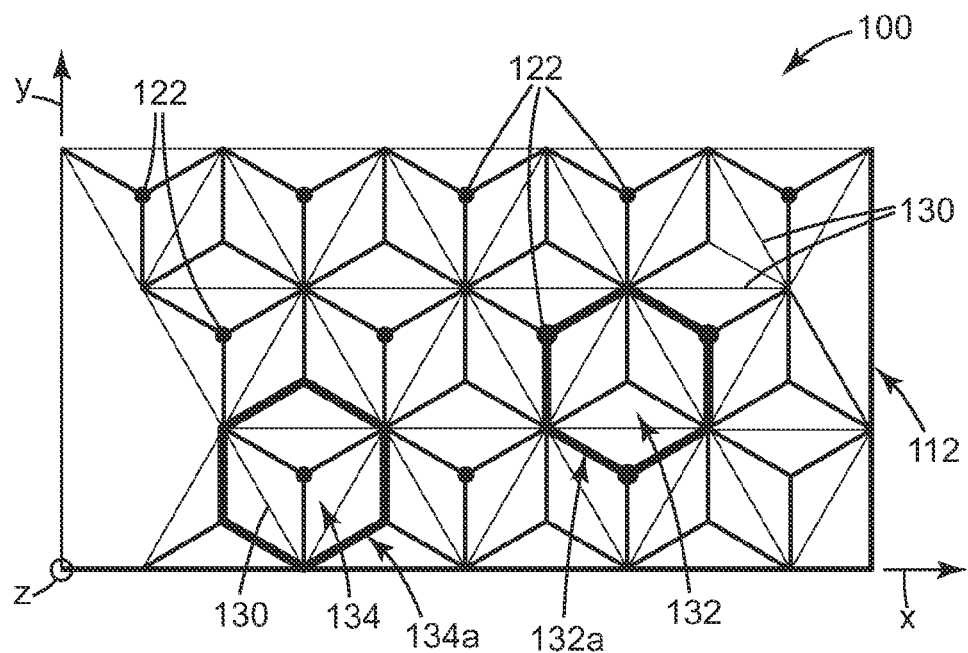
FIG. 11 is a top view of FIG. 10.

FIG. 11 shows a top view of the structured surface of FIG. 10. Transition lines 130 are drawn narrower than other lines to aid in identifying the PG cube corner elements, i.e., cube corner cavities 132 and cube corner pyramids 134. The compound faces of such PG cube corner elements extend across opposite sides of the transition lines 130 separating discrete pieces of the machined substrate 28 from the replicated substrate 70, to which they are bonded. In the illustrated embodiment, all transition lines 130 lie in a common plane referred to as a transition plane, which in the case of this embodiment is coplanar with the x-y plane. The faces of the structured surface machined in the machined substrate 28 are disposed on one side of the transition plane and the faces machined in the replicated substrate 70 are disposed on the other side.

The machined cube corner article of FIGS. 10-11 can itself function as a retroreflective article, both with respect to light incident from above (by virtue of cube corner cavities 132) and, where the substrate is at least partially transparent, with respect to light incident from below (by virtue of cube corner pyramids 134). In either case, depending upon the composition of the substrate, a specularly reflective thin coating such as aluminum, silver, or gold can be applied to the structured surface to enhance the reflectivity of the compound faces. In the case where light is incident from below, reflective coatings can be avoided in favor of an air interface that provides total internal reflection.

More commonly, however, the compound substrate of FIGS. 10-11 is used as a mold from which end-use retroreflective articles are made, whether directly or through multiple generations of molds, using conventional replication techniques. Each mold or other article made from the compound substrate will typically contain cube corner elements having at least one face terminating at a nondihedral edge of the cube corner element, the at least one face comprising two constituent faces disposed on opposed sides of a transition line, the transition line being nonparallel to such nondihedral edge. As seen from FIGS. 10-11, transition lines 130 lie in the transition plane coincident with the x-y plane, whereas nondihedral edges shown in bold for both PG cube corner cavity 132 and PG cube corner pyramid 134 are inclined relative to the x-y plane. It is also possible to fabricate surfaces where the transition lines do not all lie in the same plane, by forming groove side surfaces at different depths in the substrate.

Transition lines can in general take on a great variety of forms, depending upon details of the cutting tool used and on the degree to which the motion of the cutting tool is precisely aligned with other faces in the process of forming groove side surfaces. Although in many applications transition lines are an artifact to be minimized, in other applications they can be used to advantage to achieve a desired optical result such as a partially transparent article. A detailed discussion of various transition line configurations is set forth in commonly assigned U.S. Pat. No. 6,540,367 (Benson et al.), entitled Structured Surface Articles Containing Geometric Structures with Compound Faces and Methods for Making Same, which is incorporated by reference.

Figure 12:
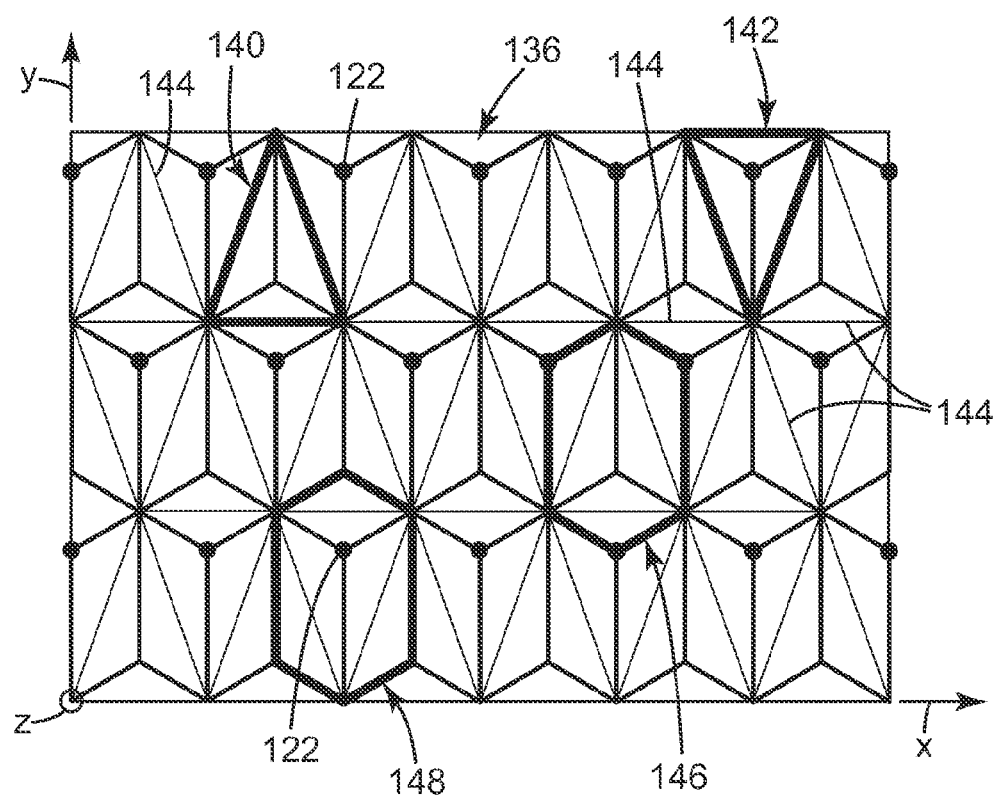

A wide variety of structured surfaces can be fabricated using the present compound substrate 82 and the machining technique described above. The PG cube corner elements of FIG. 11 each have a symmetry axis that is perpendicular to the x-y reference plane of the structured surface. Cube corner elements typically exhibit the highest optical efficiency in response to light incident on the element roughly along the symmetry axis. The amount of light retroreflected by a cube corner element generally drops as the incidence angle deviates from the symmetry axis. FIG. 12 shows a top plan view of a structured surface 136 similar to that of FIG. 11, extending along the x-y plane, except that the PG cube corner elements of FIG. 12 are all canted such that their symmetry axes are tilted with respect to the normal of the structured surface. The symmetry axis for each PG cube corner cavity 146 in FIG. 12 lies in a plane parallel to the y-z plane, having a vertical component in the +z direction (out of the page) and a transverse component in the +y direction. Symmetry axes for the PG cube corner pyramids 148 of FIG. 12 point in the opposite direction, with components in the −z and −y directions. In fabricating surface 136, a compound substrate is used wherein the protrusions of generally triangular cross-section are isosceles in shape, rather than equilateral as in FIG. 1.

Four distinct types of cube corner elements are present on the structured surface 136: truncated cube corner cavities formed in replicated substrate 70 and a triangular outline in plan view; truncated cube corner pyramids having faces machined in discrete pieces of the machined substrate 28 and triangular outline; PG cube corner cavities having compound faces and a hexagonal outline; and PG cube corner pyramids, also having compound faces and a hexagonal outline. A representative cube corner cavity formed in the replicated substrate 70 is identified in FIG. 12 by bold outline 140, and a representative cube corner pyramid machined in the machined substrate 28 is identified by bold outline 142. Transition lines 144 separate machined from formed or replicated faces, and all such lines 144 lie in a transition plane parallel to the x-y plane. In other embodiments, the transition lines may lie parallel to a transition plane but not be coplanar. Selected faces of cavities 140 and pyramids 142 form canted PG cube corner elements, in particular canted PG cube corner cavities 146 and canted PG cube corner pyramids 148. Reference points 122, as before, identify localized tips or peaks disposed above the x-y plane.

Figure 13:
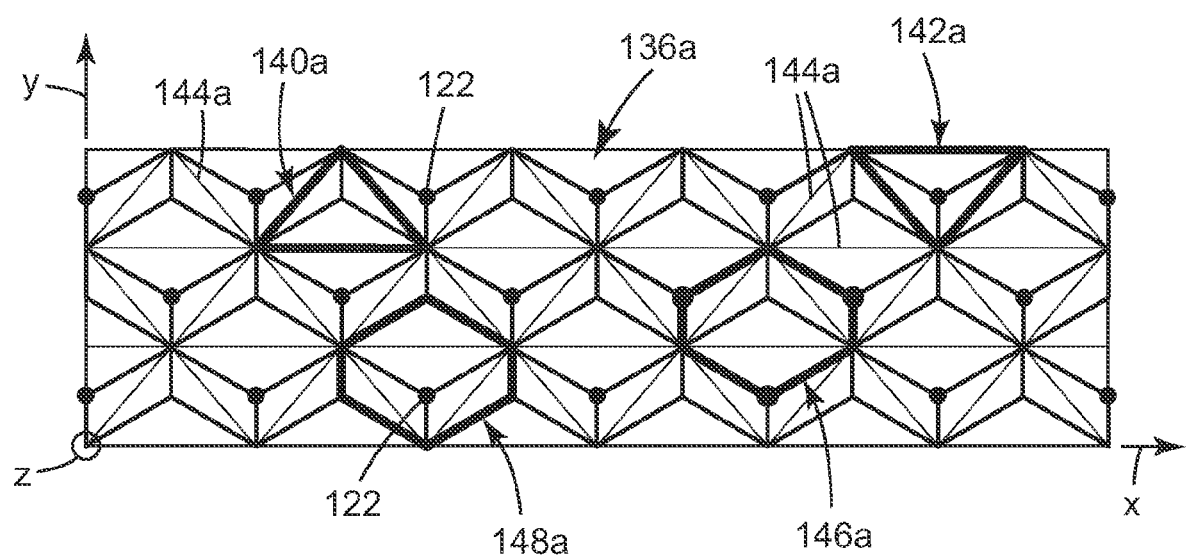

FIG. 13 shows a structured surface 136a similar to that of FIG. 12, and like features bear the same reference numeral as in FIG. 12 with the added suffix "a". PG cube corner elements of FIG. 13 are canted with respect to the normal of structured surface 136a, but in a different direction compared to that of the PG cube corner elements of FIG. 12. The symmetry axis for each PG cube corner cavity 146a is disposed in a plane parallel to the y-z plane, and has a vertical component in the +z direction and a transverse component in the −y direction.

Figure 14:
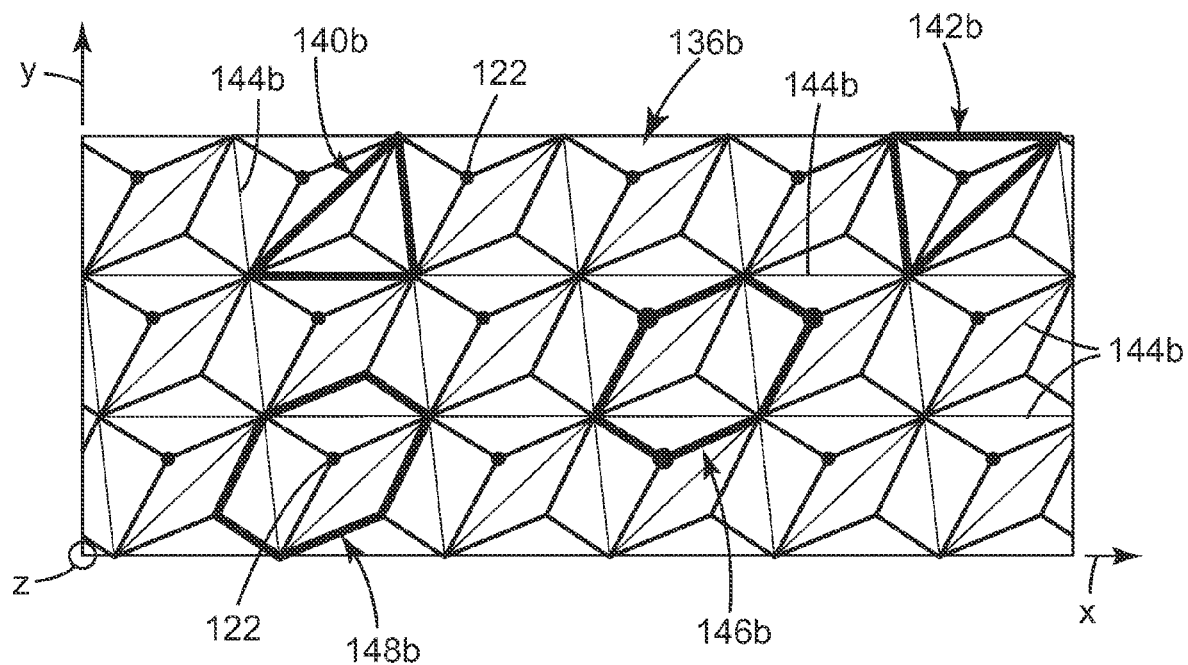
FIGS. 12-14 are top plan views of structured surfaces having canted PG cube corner elements, such surfaces being capable of fabrication using the methods discussed in connection with FIGS. 2-11.

FIG. 14 shows a structured surface similar to that of FIGS. 12 and 13, and like features bear the same reference numeral as in FIG. 12 with the added suffix "b". PG cube corner elements in FIG. 14 are also canted, but, unlike the PG cube corner elements of FIGS. 12 and 13, the degree of cant is such that the outline in plan view of each PG cube corner element has no mirror-image plane of symmetry. The cube corner cavities of FIG. 14 each have a symmetry axis that has components in the +z, +y, and −x direction. It will be noted that the triangles formed by transition lines 144 (FIG. 12) are isosceles triangles each having only one included angle less than 60 degrees; triangles formed by lines 144a (FIG. 13) are isosceles triangles each having only one included angle greater than 60 degrees; and triangles formed by lines 144b (FIG. 14) are scalene triangles. Representative values in degrees for the included angles of triangles defined by transition lines 144a are, respectively: (70, 70, 40); (80, 50, 50); and (70, 60, 50).

The embodiments discussed above have associated therewith an asymmetrical entrance angularity (i.e., when rotated about an axis within the plane of the sheeting). Embodiments with symmetrical entrance angularity are also possible, such as the matched-pair cube corner structure discussed in connection with FIGS. 15-23.

Figure 15:
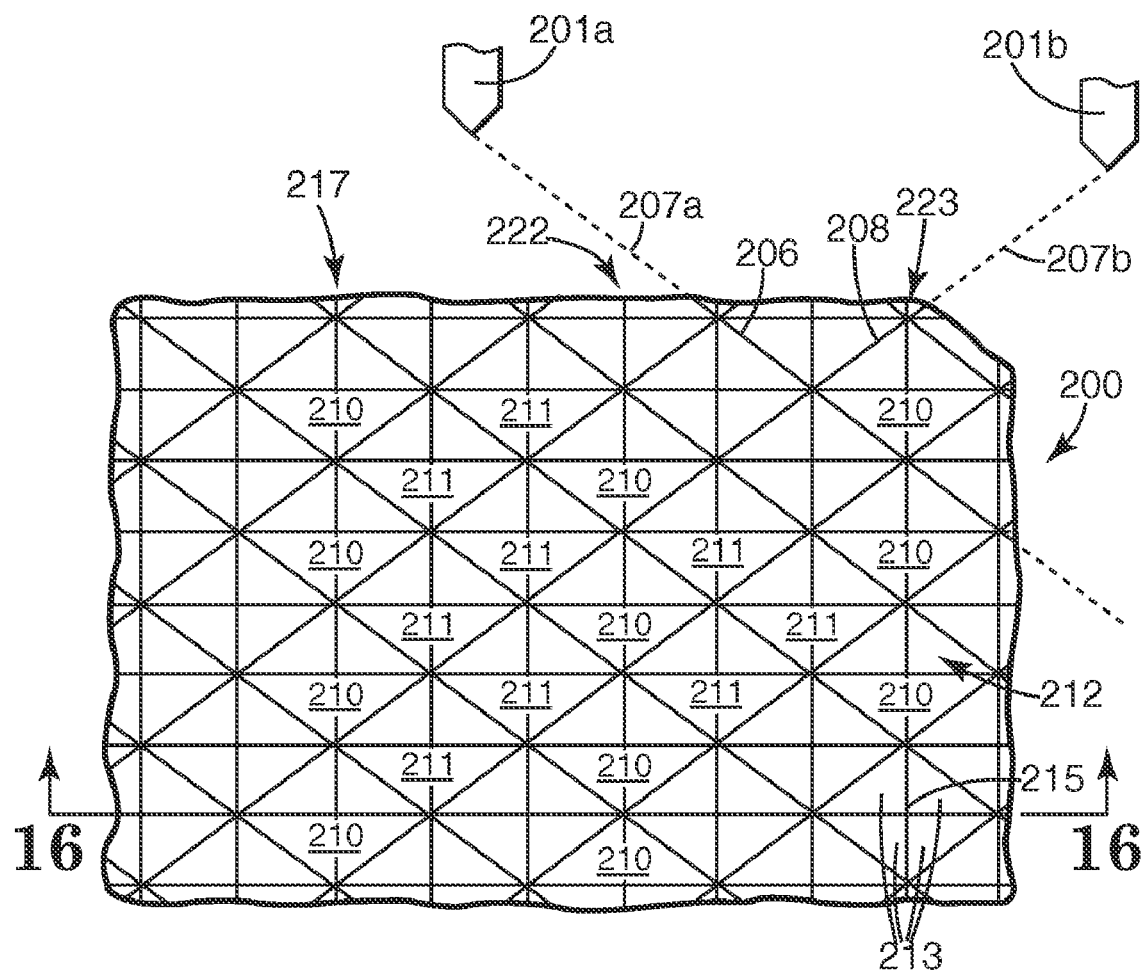
FIG. 15 is a top plan view of an alternate machined substrate in accordance with the present invention.
Figure 16:
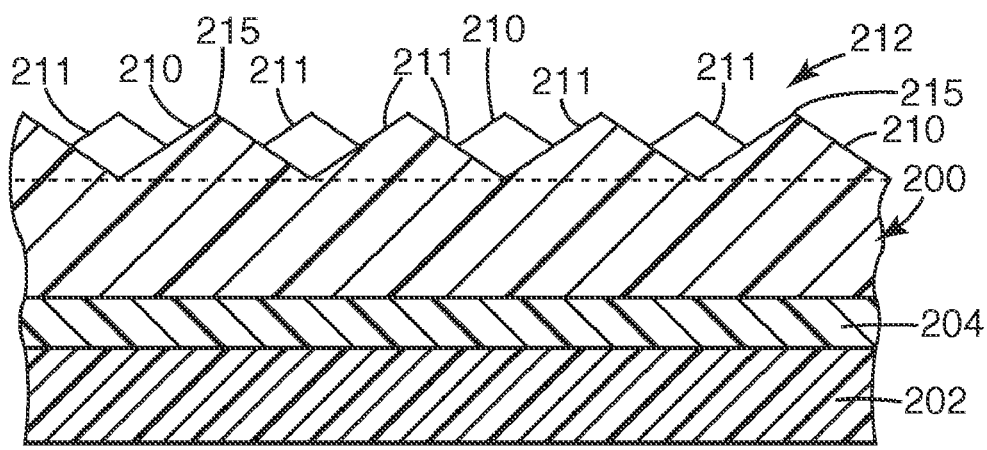
FIG. 16 is a sectional view of the substrate of FIG. 15.

FIGS. 15 and 16 depict an alternate machined substrate 200 in accordance with the present invention. The machined substrate 200 is bonded to a first machining base 202 by a first bonding layer 204. Two sets of grooves 206, 208 parallel to axis 207a 207b, respectively, are formed using tools 201a, 201b to define a machined surface 212. In the illustrated embodiment, the machined surface 212 includes faces 213 arranged in groups of four that form four-sided pyramids 210 having an apex or reference point 215. The four-sided pyramids 210 are arranged in rows 217, 222, 223. Other geometric structures 211 are also formed by the grooves 206, 208.

Figure 17:
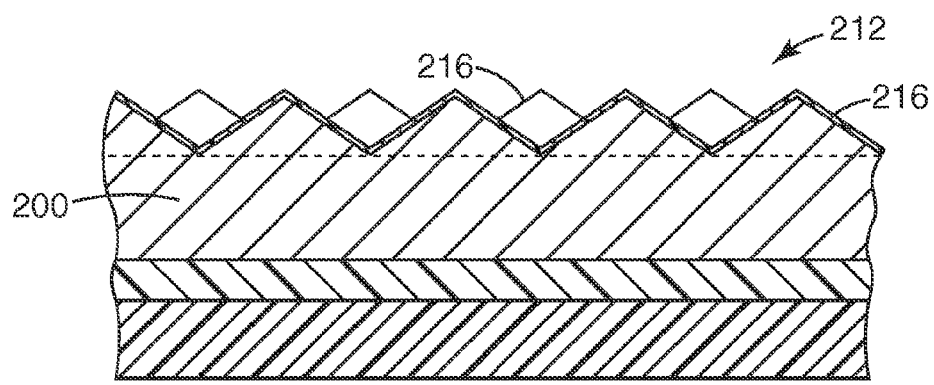
FIG. 17 is a sectional view of the substrate of FIG. 15 with a passivated surface.

As illustrated in sectional view FIG. 17, the machined surface 212 is then cleaned and passivated. The passivation step comprises applying a release layer or making a surface modification 216 (referred to collectively as "passivated surface") on the machined surface 212 to permit separation of a subsequent replicated substrate 214 (see FIG. 20). In one embodiment, the passivated surface is formed on only a portion of the machined surface 212.

Figure 18:
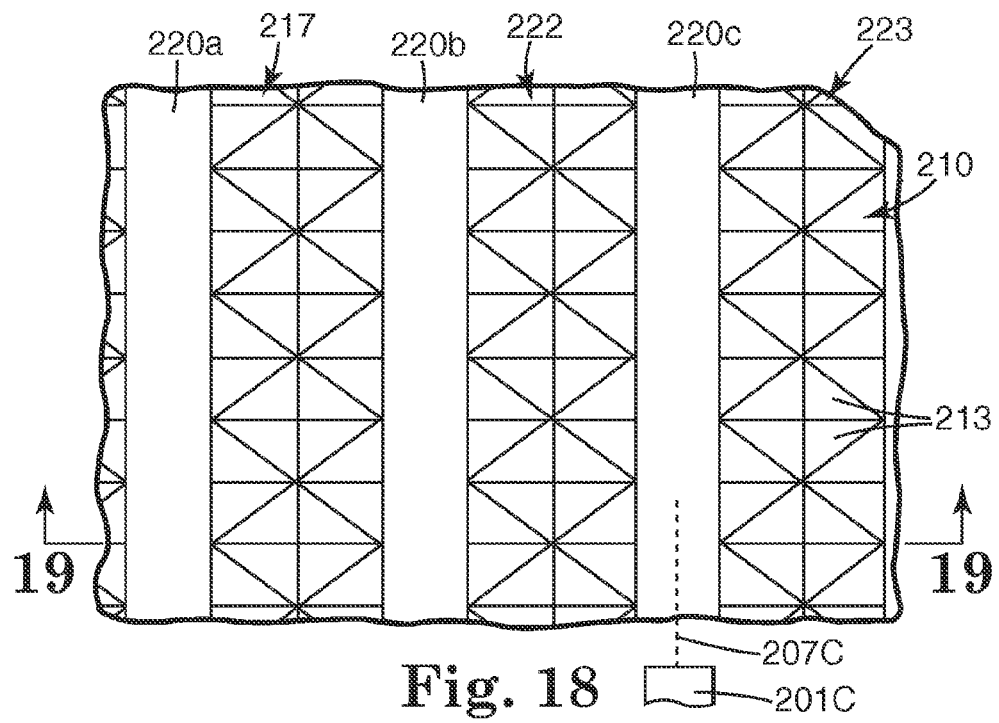
FIG. 18 is a top plan view of the substrate of FIG. 17 with portions of the passivated surface removed.
Figure 19:
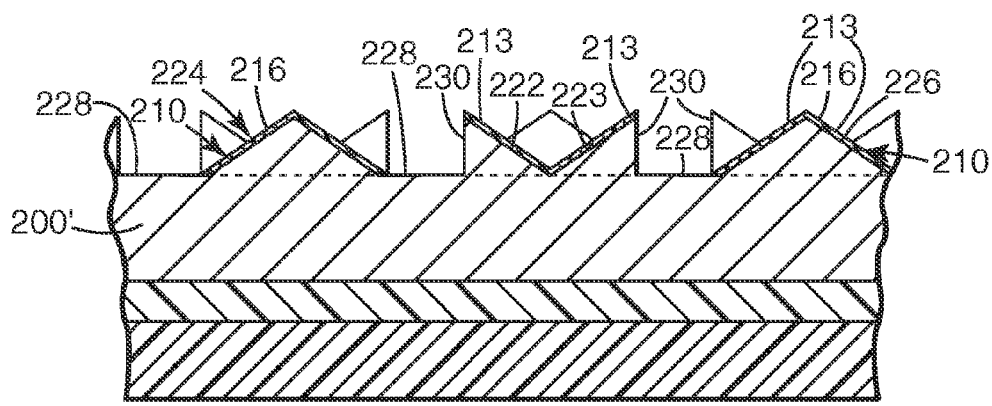
FIG. 19 is a sectional view of the substrate of FIG. 18.

As illustrated in FIGS. 18 and 19, additional grooves 220a, 220b, 220c (referred to collectively as 220) are formed in the machined surface 212 parallel to axis 207c using tool 201c in order to remove portions of some of the geometric structures 211. The grooves 220 also remove some of the surface modification 216 to permit selective adhesion of the replicated substrate 214 (see FIG. 20) to the machined surface 212. As best illustrated in FIG. 19, the passivated surface 216 is not present along flat regions 228 or along side walls 230, while the passivated surface 216 on faces 213 is substantially intact.

Figure 20:
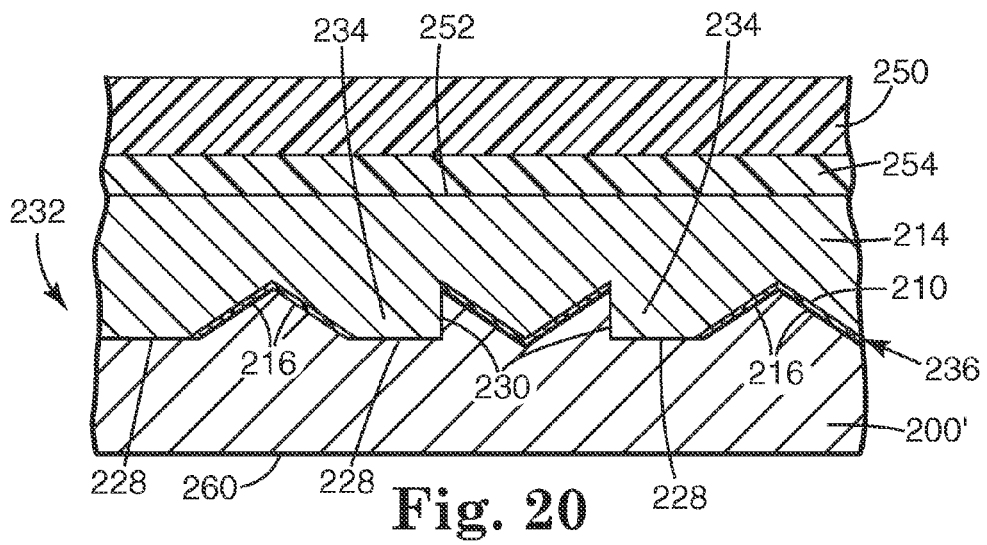
FIG. 20 is a sectional view of an assembly including a compound substrate.

FIG. 20 illustrates an assembly 232 that results after forming a replicated substrate 214 over the machined substrate 200'. Electro-plating, casting a filler material, and a variety of other techniques can form the replicated substrate 214. Due to the previous passivation step, the replicated substrate 214 adheres to the flat regions 228 and side walls 230, but not along the passivated surfaces 216. Portions 234 of the replicated substrate 214 protrude into, and bond with, the machined substrate 200' along surfaces 228, 230 to form a compound substrate 236. A second machining base 250 is bonded to rear surface 252 of the replicated substrate 214 using a suitable bonding layer 254. Like the first machining base 202, the second machining base 250 includes reference surfaces (see FIG. 3) to aid in subsequent machining steps. The first machining base 202 and bonding layer 204 are no longer needed for the process and are removed from the assembly 232. The second machining base 250 supports the compound substrate 236 during machining of the back surface 260, discussed below.

Figure 21:
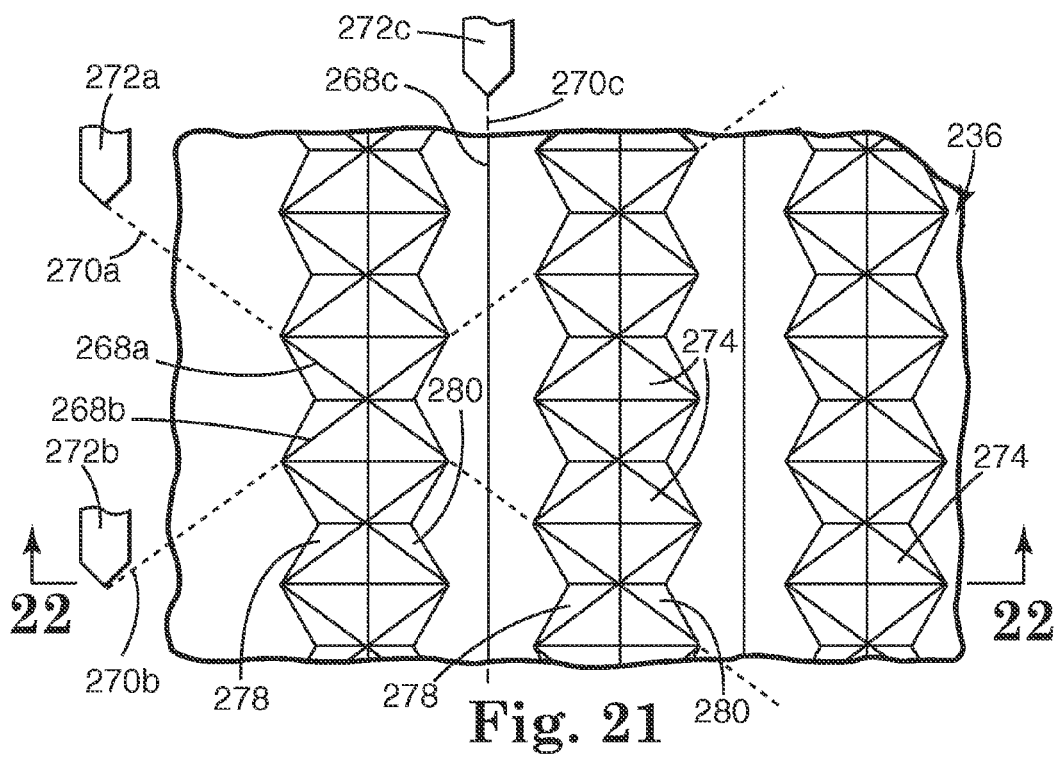
FIG. 21 is a top plan view of the machining of the compound substrate of FIG. 20.
Figure 22:
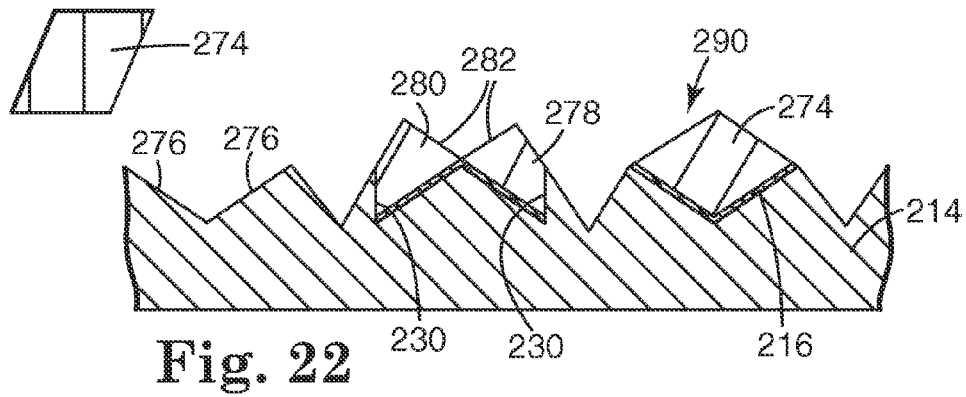
FIG. 22 is a sectional view of the substrate of FIG. 21.

FIGS. 21 and 22 illustrate the machining step performed on the back surface 260 of the compound substrate 236. Grooves 268a, 268b, 268c are formed along axes 270a, 270b, 270c using tools 272a, 272b, 272c. The grooves 268a, 268b, 268c may extend into the replicated substrate 214. Waste portions 274 are not bonded to the replicated substrate 214 because of the passivation layer 216. Consequently, after the grooves 268 are made along all three axes 270, waste portions 274 fall away or are removed, leaving four-sided cavities 276 in the replicated substrate 214.

Discrete pieces or portions 278, 280 of the compound substrate 236, however, are bonded to the replicated substrate 214 along surfaces 230. Bottom or proximal portions of the portions 278, 280 are machined to form three-sided pyramids 282. The portions 278, 280 of the machined substrate 200' remain embedded in the replicated substrate 214 portion of the compound substrate 236. Once all of the waste portions 274 of the compound substrate 236 are removed from the replicated substrate 214, thus exposing all of the four-sided cavities 276, the three-sided pyramids 282 and four-sided cavities 276 form a geometric structured surface 290 comprising an array of PG cube corner elements (see FIG. 23).

In an embodiment where the machined substrate 200' and/or the replicated substrate 214 are formed from a transparent or semi-transparent material, or where the interface between the machined substrate 200' and replicated substrate 214 can be viewed along the perimeter of compound substrate 236, reference pads such as illustrated in connection with FIGS. 2-8 may be unnecessary. That is, alignment of the tools can be accomplished without resort to the reference pad. Where the machined substrate 200' is formed from an opaque material such as metal, reference pads such as illustrated in FIG. 2 provide precise reference points so that the machining step illustrated in FIG. 21 can be performed.

Figure 23:
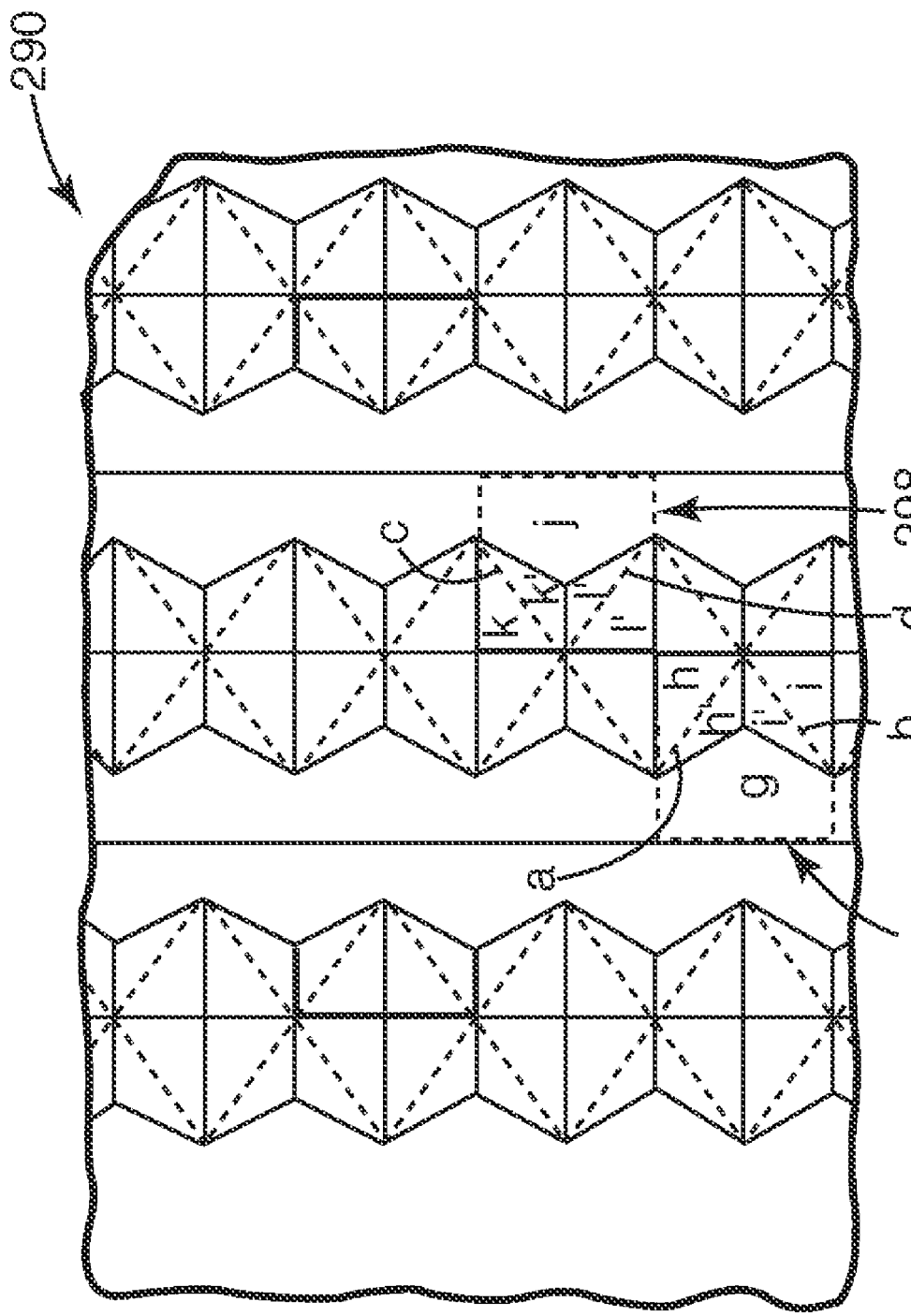
FIG. 23 is a top plan view of the compound substrate of FIG. 21 after the second machining operation.

FIG. 23 illustrates the geometric structured surface 290 after all groove side surfaces have been formed. This geometry results in two different types of PG cube corner elements on the structured surface. Cube corner pyramid 296 has face g and compound faces h, h'; i, i' separated by transition lines a and b, respectively. Cube corner pyramid 298 has face j and compound faces k, k'; l, l' separated by transition lines c and d, respectively. Faces g and j are polygons with more than three sides. Consequently, in the top view of FIG. 23, the cube corner pyramids 296, 298 each have a rectangular shape as shown by the respective dashed outlines, rather than a hexagonal outline as depicted in FIGS. 10-14. In an embodiment where the grooves 272c are all of the same depth, the cube corner elements 296 and 298 are opposing or matched pair cube corner elements that provide symmetric entrance angularity. Depending upon the aspect ratio, the plan view rectangular outlines of the cube corner elements can also include a square outline.

Cube corner elements of FIG. 23 can be (forward or backward) canted or uncanted as desired. Producing cube corner elements that are canted to a greater or lesser degree is accomplished by tailoring the shape of the diamond-shaped protrusions and then the orientation of the groove side surfaces (g, h, i, j, k, l) to be in conformance with the desired degree of canting. If canting is used, then such matched pairs can, in keeping with principles discussed in U.S. Pat. Nos. 4,588,258 (Hoopman), 5,812,315 (Smith et al.), and 5,822,121 (Smith et al.), give rise to widened retroreflective angularity so that an article having the structured surface will be visible over a widened range of entrance angles.

During the present machining process, the cutting tool removes a relatively large amount of material because the angle between the steeply inclined side wall and the subsequent machined face is often in excess of 10 degrees, typically ranging from about 10 to about 45 degrees. Some of the groove side surfaces can then be formed in such a modified machined substrate by leaving more material on the cavities or protrusions during either or both machining steps, thereby reducing tool forces which could detrimentally cause distortions. Another benefit is less wear on the cutting tool. A modified machined substrate can also be used as a master from which future generations of positive/negative molds can be made. Various geometric configurations for modified machined substrate are disclosed in commonly assigned U.S. Pat. No. 6,540,367 (Benson et al.), entitled Structured Surface Articles Containing Geometric Structures with Compound Faces and Methods for Making Same, which is incorporated by reference. The cube corner elements disclosed herein can be individually tailored so as to distribute light retroreflected by the articles into a desired pattern or divergence profile, as taught by U.S. Pat. No. 4,775,219 (Appledorn et al.). For example, compound faces that make up the PG cube corner elements can be arranged in a repeating pattern of orientations that differ by small amounts, such as a few arc-minutes, from the orientation that would produce mutual orthogonality with the other faces of cube corner element. This can be accomplished by machining groove side surfaces (both those that ultimately become the faces in the finished mold below the transition plane as well as those that become faces in the finished mold above the transition plane) at angles that differ from those that would produce mutually orthogonal faces by an amount known as a "groove half-angle error". Typically the groove half-angle error introduced will be less than ±20 arc minutes and often less than ±5 arc minutes. A series of consecutive parallel groove side surfaces can have a repeating pattern of groove half-angle errors such as abbaabba . . . or abcdabcd . . . , where a, b, c, and d are unique positive or negative values. In one embodiment, the pattern of groove half-angle errors used to form faces in the finished mold above the transition plane can be matched up with the groove half-angle errors used to form faces in the finished mold below the transition plane. In this case, the portions of each compound face on the machined substrate and the replicated substrate will be substantially angularly aligned with each other. In another embodiment, the pattern used to form one set of faces can differ from the pattern used to form the other, as where the faces below the transition plane incorporate a given pattern of nonzero angle errors and faces above the transition plane incorporate substantially no angle errors or a different pattern of non-zero errors. In this latter case, the portions of each compound face on the machined substrate and the replicated substrate will not be precisely angularly aligned with each other.

Advantageously, such substrates can serve as a master substrate from which future generations of positive/negative molds can be made, all having the same general shape of cube corner element in plan view but having slightly different face configurations. One such daughter mold can incorporate cube corner elements that each have compound faces whose constituent faces are aligned, the compound faces all being mutually perpendicular to the remaining faces of the cube corner element. Another such daughter mold can incorporate cube corner elements that also have compound faces whose constituent faces are aligned, but the compound faces can differ from orthogonality with remaining faces of the cube corner element. Still another such daughter mold can incorporate cube corner elements that have compound faces whose constituent faces are not aligned. All such daughter molds can be made from a single master mold with a minimal amount of material removed by machining.

The working surface of the mold substrates can have any suitable physical dimensions, with selection criteria including the desired size of the final mold surface and the angular and translational precision of the machinery used to cut the groove surfaces. The working surface has a minimum transverse dimension that is greater than two cube corner elements, with each cube corner element having a transverse dimension and/or cube height preferably in the range of about 25 µm to about 1 mm, and more preferably in the range of about 25 µm to about 0.25 mm. The working surface is typically a square several inches on a side, with four inch (10 cm) sides being standard. Smaller dimensions can be used to more easily cut grooves in registration with formed surfaces over the whole structured surface. The substrate thickness can range from about 0.5 to about 2.5 mm. (The measurements herein are provided for illustrative purposes only and are not intended to be limiting.) A thin substrate can be mounted on a thicker base to provide rigidity. Multiple finished molds can be combined with each other, e.g., by welding in known tiling arrangements to yield a large tiled mold that can then be used to produce tiled retroreflective products.

In the manufacture of retroreflective articles such as retroreflective sheeting, the structured surface of the machined substrate is used as a master mold that can be replicated using electroforming techniques or other conventional replicating technology. The structured surface can include substantially identical cube corner elements or can include cube corner elements of varying sizes, geometry, or orientations. The structured surface of the replica, sometimes referred to in the art as a 'stamper', contains a negative image of the cube corner elements. This replica can be used as a mold for forming a retroreflective article. More commonly, however, a large number of suitable replicas are assembled side-by-side to form a tiled mold large enough to be useful in forming tiled retroreflective sheeting. Retroreflective sheeting can then be manufactured as an integral material, e.g., by embossing a preformed sheet with an array of cube corner elements as described above or by casting a fluid material into a mold. See, JP 8-309851 and U.S. Pat. No. 4,601,861 (Pricone). Alternatively, the retroreflective sheeting can be manufactured as a layered product by casting the cube corner elements against a preformed film as taught in PCT application No. WO 95/11464 (Benson, Jr. et al.) and U.S. Pat. No. 3,684,348 (Rowland) or by laminating a preformed film to preformed cube corner elements. By way of example, such sheeting can be made using a nickel mold formed by electrolytic deposition of nickel onto a master mold. The electroformed mold can be used as a stamper to emboss the pattern of the mold onto a polycarbonate film approximately 500 µm thick having an index of refraction of about 1.59. The mold can be used in a press with the pressing performed at a temperature of approximately 175° to about 200° C.

The various mold substrates discussed above can generally be categorized into two groups: replicated substrates, which receive at least part of their structured surface by replication from a prior substrate, and bulk substrates, which do not. Suitable materials for use with bulk mold substrates are well known to those of ordinary skill in the art, and generally include any material that can be machined cleanly without burr formation and that maintains dimensional accuracy after groove formation. A variety of materials such as machinable plastics or metals may be utilized. Acrylic is an example of a plastic material; aluminum, brass, electroless nickel, and copper are examples of useable metals.

Suitable materials for use with replicated mold substrates that are not subsequently machined are well known to those of ordinary skill in the art, and include a variety of materials such as plastics or metals that maintain faithful fidelity to the prior structured surface. Thermally embossed or cast plastics such as acrylic or polycarbonate can be used. Metals such as electrolytic nickel or nickel alloys are also suitable.

Suitable materials for use with replicated mold substrates whose structured surface is subsequently machined are also well known to those of ordinary skill in the art. Such materials should have physical properties such as low shrinkage or expansion, low stress, and so on that both ensure faithful fidelity to the prior structured surface and that lend such materials to diamond machining A plastic such as acrylic (PMMA) or polycarbonate can be replicated by thermal embossing and then subsequently diamond machined. Suitable hard or soft metals include electrodeposited copper, electroless nickel, aluminum, or composites thereof.

With respect to retroreflective sheeting made directly or indirectly from such molds, useful sheeting materials are preferably materials that are dimensionally stable, durable, weatherable and readily formable into the desired configuration. Examples of suitable materials include acrylics, which generally have an index of refraction of about 1.5, such as Plexiglas resin from Rohm and Haas; thermoset acrylates and epoxy acrylates, preferably radiation cured, polycarbonates, which have an index of refraction of about 1.6; polyethylene-based ionomers (marketed under the name 'SURLYN'); polyesters; and cellulose acetate butyrates. Generally any optically transmissive material that is formable, typically under heat and pressure, can be used. Other suitable materials for forming retroreflective sheeting are disclosed in U.S. Pat. No. 5,450,235 (Smith et al.). The sheeting can also include colorants, dyes, UV absorbers, or other additives as needed.

It is desirable in some circumstances to provide retroreflective sheeting with a backing layer. A backing layer is particularly useful for retroreflective sheeting that reflects light according to the principles of total internal reflection. A suitable backing layer can be made of any transparent or opaque material, including colored materials, that can be effectively engaged with the disclosed retroreflective sheeting. Suitable backing materials include aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

The backing layer or sheet can be sealed in a grid pattern or any other configuration suitable to the reflecting elements. Sealing can be affected by use of a number of methods including ultrasonic welding, adhesives, or by heat sealing at discrete locations on the arrays of reflecting elements (see, e.g., U.S. Pat. No. 3,924,928). Sealing is desirable to inhibit the entry of contaminants such as soil and/or moisture and to preserve air spaces adjacent the reflecting surfaces of the cube corner elements.

If added strength or toughness is required in the composite, backing sheets of polycarbonate, polybutryate or fiber-reinforced plastic can be used. Depending upon the degree of flexibility of the resulting retroreflective material, the material can be rolled or cut into strips or other suitable designs. The retroreflective material can also be backed with an adhesive and a release sheet to render it useful for application to any substrate without the added step of applying an adhesive or using other fastening means.

GLOSSARY OF SELECTED TERMS

An "array of neighboring cube corner elements" means a given cube corner element together with all adjacent cube corner elements bordering it.

"Compound face" means a face composed of at least two distinguishable faces (referred to as "constituent faces") that are proximate each other. The constituent faces are substantially aligned with one another, but they can be offset translationally and/or rotationally with respect to each other by relatively small amounts (less than about 10 degrees of arc, and preferably less than about 1 degree of arc) to achieve desired optical effects as described herein.

"Compound substrate" means a substrate formed from a machined substrate having a structured surface and a replicated substrate (collectively referred to as "layers") bonded along at least a portion of the interface with the machined substrate. One or more of the layers of the compound substrate may be discontinuous.

"Cube corner cavity" means a cavity bounded at least in part by three faces arranged as a cube corner element.

"Cube corner element" means a set of three faces that cooperate to retroreflect light or to otherwise direct light to a desired location. Some or all of the three faces can be compound faces. "Cube corner element" also includes a set of three faces that itself does not retroreflect light or otherwise direct light to a desired location, but that if copied (in either a positive or negative sense) in a suitable substrate forms a set of three faces that does retroreflect light or otherwise direct light to a desired location.

"Cube corner pyramid" means a mass of material having at least three side faces arranged as a cube corner element.

"Cube height" means, with respect to a cube corner element formed on or formable on a substrate, the maximum separation along an axis perpendicular to the substrate between portions of the cube corner element.

"Dihedral edge" of a cube corner element is an edge of one of the three faces of the cube corner element that adjoins one of the two other faces of the same cube corner element. Note that any particular edge on a structured surface may or may not be a dihedral edge, depending upon which cube corner element is being considered.

"Direct machining" refers to forming in the plane of a substrate one or more groove side surfaces typically by drawing a cutting tool along an axis substantially parallel to the plane of the substrate.

"Face" means a substantially smooth surface.

"Geometric structure" means a protrusion or cavity having a plurality of faces.

"Groove" means a cavity elongated along a groove axis and bounded at least in part by two opposed groove side surfaces.

"Groove side surface" means a surface or series of surfaces capable of being formed by drawing one or more cutting tools across a substrate in a substantially continuous linear motion. Such motion includes fly-cutting techniques where the cutting tool has a rotary motion as it advances along a substantially linear path.

"Nondihedral edge" of a cube corner element is an edge of one of the three faces of the cube corner element that is not a dihedral edge of such cube corner element. Note that any particular edge on a structured surface may or may not be a nondihedral edge, depending upon which cube corner element is being considered.

"PG cube corner element" stands for "preferred geometry" cube corner element, and is defined in the context of a structured surface of cube corner elements that extends along a reference plane. For the purposes of this application, a PG cube corner element means a cube corner element that has at least one nondihedral edge that: (1) is nonparallel to the reference plane; and (2) is substantially parallel to an adjacent nondihedral edge of a neighboring cube corner element. A cube corner element whose three reflective faces are all rectangles (inclusive of squares) is one example of a PG cube corner element.

"Protrusion" has its broad ordinary meaning, and can comprise a pyramid.

"Pyramid" means a protrusion having three or more side faces that meet at a vertex, and can include a frustum.

"Reference plane" means a plane or other surface that approximates a plane in the vicinity of a group of adjacent cube corner elements or other geometric structures, the cube corner elements or geometric structures being disposed along the plane.

"Retroreflective" means having the characteristic that obliquely incident incoming light is reflected in a direction antiparallel to the incident direction, or nearly so, such that an observer at or near the source of light can detect the reflected light.

"Structured" when used in connection with a surface means a surface that has a plurality of distinct faces arranged at various orientations.

"Symmetry axis" when used in connection with a cube corner element refers to the vector that originates at the cube corner apex and forms an equal acute angle with the three faces of the cube corner element. It is also sometimes referred to as the optical axis of the cube corner element.

"Transition line" means a line or other elongated feature that separates constituent faces of a compound face.

"Waste pieces" means portions of the compound substrate that are discarded using the present fabrication methods.

All patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A cube corner element, comprising:
   a replicated substrate including a replicated substrate face; and
   a diamond-machined substrate piece including a diamond-machined substrate face, the diamond-machined substrate piece embedded in a portion of the replicated substrate such that the replicated substrate face and the diamond-machined substrate face are substantially aligned with one another to form a compound face.

2. The cube corner element of claim 1, wherein the cube corner element forms a pyramid.

3. The cube corner element of claim 1, wherein the cube corner element has a cube height of no greater than about 1 mm and the replicated substrate face and diamond-machined substrate face are disposed on opposite sides of a transition line that is nonparallel to a dihedral edge of the cube corner element.

4. The cube corner element of claim 1, wherein the replicated substrate face and the diamond-machined substrate face are disposed on opposite sides of a transition line and the transition line is parallel to a reference plane.

5. The cube corner element of claim 1, wherein the cube corner element is part of one of a lamina, mold, or master.

6. The cube corner element of claim 5, further comprising:
   retroreflective sheeting that is a replica of the lamina, mold, or master.

7. The cube corner element of claim 6, wherein at least one of the cube corner elements has an outline in plan view selected from the group of shapes consisting of a hexagon and a quadrilateral.

8. The cube corner element of claim 6, wherein at least some of the plurality of cube corner elements are PG cube corner elements.

9. The cube corner element of claim 6, wherein the plurality of cube corner elements are part of a structured surface that comprises cavities formed in the replicated substrate and pyramids formed at least in part by the diamond-machined substrate.

10. The cube corner element of claim 9, wherein the cavities are one of three and four sided cavities.

11. The cube corner element of claim 6, wherein at least some of the cube corner elements are canted and form matched pairs of cube corner elements.

* * * * *